US010754836B1

(12) United States Patent
Kedikian

(10) Patent No.: US 10,754,836 B1
(45) Date of Patent: Aug. 25, 2020

(54) FACIAL BASED IMAGE ORGANIZATION AND RETRIEVAL METHOD

(71) Applicant: Resource Consortium Limited, Tortola (VG)

(72) Inventor: Roland H. Kedikian, Glendale, CA (US)

(73) Assignee: RESOURCE CONSORTIUM LIMITED, LLC

( * ) Notice: Subject to any disclaimer, the term of this patent is extended or adjusted under 35 U.S.C. 154(b) by 0 days.

(21) Appl. No.: 13/740,410

(22) Filed: Jan. 14, 2013

Related U.S. Application Data

(63) Continuation of application No. 11/796,926, filed on Apr. 30, 2007, now abandoned, which is a continuation-in-part of application No. 11/704,056, filed on Feb. 8, 2007, now Pat. No. 7,916,976, which is a continuation of application No. 11/544,994, filed on Oct. 5, 2006, now abandoned.

(51) Int. Cl.
*G06K 9/00* (2006.01)
*G06F 16/22* (2019.01)
*G06F 16/532* (2019.01)

(52) U.S. Cl.
CPC ............ *G06F 16/22* (2019.01); *G06F 16/532* (2019.01)

(58) Field of Classification Search
CPC .......... G06K 9/00288; G06K 9/00221; G06K 2009/00328; G06K 9/00295; G06K 9/00677; G06K 2209/27; G06K 9/627; G06F 3/04842; G06F 17/30247; G06F 17/30244; G06Q 50/01
USPC .................. 382/118, 305; 707/915, 999.107
See application file for complete search history.

(56) References Cited

U.S. PATENT DOCUMENTS

| | | | |
|---|---|---|---|
| 5,781,773 A | * | 7/1998 | Vanderpool ............. G06F 16/40 707/693 |
| 6,606,398 B2 | | 8/2003 | Cooper |
| 7,010,751 B2 | | 3/2006 | Schneiderman |
| 7,043,474 B2 | | 5/2006 | Mojsilovic et al. |
| 7,274,822 B2 | | 9/2007 | Zhang et al. |
| 7,298,931 B2 | | 11/2007 | Kim et al. |
| 7,343,365 B2 | | 3/2008 | Farnham et al. |
| 7,486,807 B2 | | 2/2009 | Nagahashi |
| 7,519,200 B2 | | 4/2009 | Gokturk et al. |
| 7,551,755 B1 | * | 6/2009 | Steinberg et al. ............ 382/118 |
| 7,636,450 B1 | | 12/2009 | Bourdev |
| 7,715,597 B2 | | 5/2010 | Costache et al. |

(Continued)

OTHER PUBLICATIONS

U.S. Appl. No. 60/760,573, filed Jan. 21, 2016 Provi. of Case US 2007/0172155 A1; Guckenberg Specification and Drawings.*
Veltkamp et al (Oct. 2002) "Content-based image retrieval systems: a survey." State of the Art in Content Based Image and Video Retrieval, pp. 97-124.

(Continued)

*Primary Examiner* — Kim Y Vu
*Assistant Examiner* — Michael J Vanchy, Jr.
(74) *Attorney, Agent, or Firm* — The Belles Group, P.C.

(57) ABSTRACT

Embodiments of the invention include a system and set of processes for organizing image collections. The system detects individuals in each image uploaded into the system using facial recognition or similar methods. The user and viewers of the images may then view dynamic albums based on the interrelationships of individuals in images. Users and viewers may browse all images with an individual or see albums of images with two selected individuals or similar combinations based on the relationships between users.

20 Claims, 26 Drawing Sheets

(56) References Cited

U.S. PATENT DOCUMENTS

| | | | |
|---|---|---|---|
| 7,716,157 | B1 | 5/2010 | Bourdev et al. |
| 2002/0039447 | A1 | 4/2002 | Schniberg et al. |
| 2002/0107973 | A1 | 8/2002 | Lennon et al. |
| 2003/0210808 | A1 | 11/2003 | Chen et al. |
| 2004/0012601 | A1* | 1/2004 | Sang, Jr. ............. G06F 17/3028 345/581 |
| 2004/0264780 | A1* | 12/2004 | Zhang et al. ................. 382/224 |
| 2005/0197846 | A1 | 9/2005 | Pezaris et al. |
| 2006/0114338 | A1* | 6/2006 | Rothschild ........ G06F 17/30265 348/231.99 |
| 2006/0239515 | A1 | 10/2006 | Zhang et al. |
| 2006/0251292 | A1* | 11/2006 | Gokturk ............. G06K 9/00375 382/103 |
| 2006/0274960 | A1* | 12/2006 | Tamaru ........................ 382/274 |
| 2007/0011422 | A1* | 1/2007 | Srinivasan ........ G06F 17/30244 711/165 |
| 2007/0098303 | A1 | 5/2007 | Gallagher |
| 2007/0172155 | A1* | 7/2007 | Guckenberger .. G06F 17/30247 382/305 |

OTHER PUBLICATIONS

Kherfi et al. (Mar. 2004) "Image retrieval from the world wide web: issues, techniques and systems." ACM Computing Surveys, vol. 366 No. 1, pp. 35-67.

Pentland et al. (Jan. 1995) "Photobook: Content-based manipulation of image databases." Int' J. Computer Vision, vol. 18 No. 3, pp. 233-254.

Flickner et al. (Sep. 1995) "Query by image and video content: the QBIC System." IEEE Computer, pp. 23-32.

Riya Visual Search (2005). http://www.riya.com/.

Lenssen, P. (Aug. 2006) "Google buys Neven Vision" http://blog.outer-court.com/archive/2006-08-15-n52.html.

Graham, A. (Aug. 2006) "A better way to organize photos?" http://googleblog.blogspot.com/200608/better-way-to-organize-photos.html.

Kedikian, Roland, First Office Action dated Oct. 5, 2010 for U.S. Appl. No. 11/796,926, 12 pages.

Kedikian, Roland, First Office Action dated 6/1/100 for U.S. Appl. No. 11/704,056, 22 pages.

Kedikian, Roland, Final Office Action dated Nov. 8, 2010 for U.S. Appl. No. 11/704,056, 18 pages.

* cited by examiner

Browser

ORGANIZE | PREFERENCES | ACCOUNT | MESSAGES

Albums | Images | People in Images | Contacts

| Name ▽ | Date ▽ | Pictures ▽ | Faces Organized | Faces Remaining | % Completed | People | Edit Images |
|---|---|---|---|---|---|---|---|
| Aruba-Vacation | 2006-05-01 | 198 | 118 | 18 | % 84.75 | organize | edit images |
| Andy's BDay | 2006-04-15 | 59 | 35 | | % 100.00 | organize | edit images |
| 01-getting-ready | 2004-12-31 | 94 | 191 | 2 | % 98.95 | organize | edit images |
| 02-dancing | 2004-12-31 | 27 | 34 | 2 | % 94.12 | organize | edit images |
| 04-new-year | 2004-12-31 | 86 | 149 | 2 | % 98.66 | organize | edit images |
| Day-After | 2004-12-30 | 9 | 9 | 0 | % 100.00 | organize | edit images |
| New-Year | | 0 | 0 | | - | organize | edit images |
| 03-santa-clause | 2004-12-30 | 35 | 57 | 4 | % 92.98 | organize | edit images |

Browser

Albums | Images | People in Images | Contacts

ORGANIZE | PREFERENCES | ACCOUNT | MESSAGES

800

| First Name | Last Name | Nick Name | Email | Images | Contacts | |
|---|---|---|---|---|---|---|
| Zee | G | Zee G | | 10 | edit | Images |
| Teresse | ? | Teresse ? | | 4 | edit | Images |
| Sogomon | M | Sogomon M | | 5 | edit | Images |
| Sime | m | Sime M | | 8 | edit | Images |
| Sevag Serge | G | Sevag Serge | | 10 | edit | Images |
| Serop | A | Serop A | | 18 | edit | Images |
| Sebou | A | Sebou A | | 17 | edit | Images |
| Sam | b | Sam B | | 7 | edit | Images |
| Roupen | G | Roupen G | | 4 | edit | Images |
| Rony | K | Rony K | | 10 | edit | Images |
| Roland | K | Roland K | rolandk_98@email.com | 43 | edit | Images |
| Roger | G | Roger G | | 8 | edit | Images |
| Robert | G | Robert G | | 8 | edit | Images |
| Raff | B | Raff B | | 7 | edit | Images |
| Raff | G | Raff | | 12 | edit | Images |
| Nichole | R | Nichole R | | 1 | edit | Images |
| Nella | K | Nella K | | 9 | edit | Images |
| Nareg | B | Nareg B | | 10 | edit | Images |
| Nanor | B | Nanor B | | 13 | edit | Images |
| Mark | G | Mark G Sr. | | 8 | edit | Images |
| Mark Jr. | G | Mark G Jr. | | 10 | edit | Images |
| Marie | G | Marie G | | 15 | edit | Images |
| Lena | m | Lena M | | 16 | edit | Images |
| Lena | B | Lena B | | 13 | edit | Images |
| John | G | John G | | 8 | edit | Images |
| Isabella | K | Isabella K | | 67 | edit | Images |
| Hourie | G | Hourie G | | 8 | edit | Images |
| Hourie | B | Hourie B | | 12 | edit | Images |
| Grace | A | Grace A | | 33 | edit | Images |
| Diana | R | Diana R | | 5 | edit | Images |
| Diana | G | Diana G | | 15 | edit | Images |
| Chris | S | Chris S | | 3 | edit | Images |
| Chantal | A | Chantal A | | 8 | edit | Images |

FACIAL BASED IMAGE ORGANIZATION AND RETRIEVAL METHOD

CROSS REFERENCE TO RELATED APPLICATIONS

This application is a continuation of U.S. patent application Ser. No. 11/796,926, filed Apr. 30, 2007, entitled Facial Based Image Organization and Retrieval Method, which is a continuation-in-part of U.S. patent application Ser. No. 11/704,056 (now U.S. Patent No. 7,916,976), filed Feb. 8, 2007, entitled Facial Based Image Organization and Retrieval Method, which is a continuation of U.S. patent application Ser. No. 11/544,994 (now abandoned), filed Oct. 5, 2006, entitled Facial Based Image Organization and Retrieval Method, the entire disclosures of which are incorporated herein by reference.

BACKGROUND

FIELD

Embodiments of the invention relate to a method and system for organizing images such as digital photographs. Specifically, the embodiments relate to a system and method for organizing the images based on identified features such as faces within the images.

BACKGROUND

The online storage and management of digital images has become an enterprise with many companies offering services that allow a user to upload and share digital images with other users. The services these companies offer are similar in nature. Typically these services allow a user to upload a set of pictures and organized them into sets that may each be labeled as albums.

The online services often have specialized local clients that must be installed before images can be uploaded to the servers. The local client manages the upload and may provide some limited image manipulation functionality such as image rotation or cropping. The online services typically provide a limited amount of storage for the images that are uploaded and limit the duration for which the images may be stored.

The organization of the uploaded images is limited to placing them in albums that may have titles and dates associated with them, but do not have any internal order except for a sequence of images assigned to the album.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

FIG. 5 is a diagram of one embodiment of an interface for viewing an album organization overview.

FIG. 8 is a diagram of one embodiment of contact list for a user account.

FIG. 20 is a diagram of one embodiment of an interface including a list of other users with images in the system.

DETAILED DESCRIPTION

In the following description, for the purpose of explanation, numerous specific details are set forth to provide a thorough understanding of the various embodiments. It will be apparent to one of ordinary skill in the art that the embodiments may be practiced without some of these specific details. In other instances, certain structures and devices are omitted or simplified to avoid obscuring the details of the various embodiments.

The following description and the accompanying drawings provide examples for the purposes of illustration. However, these examples should not be construed in a limiting sense as they are not intended to provide an exhaustive list of all possible implementations.

Figure 1:
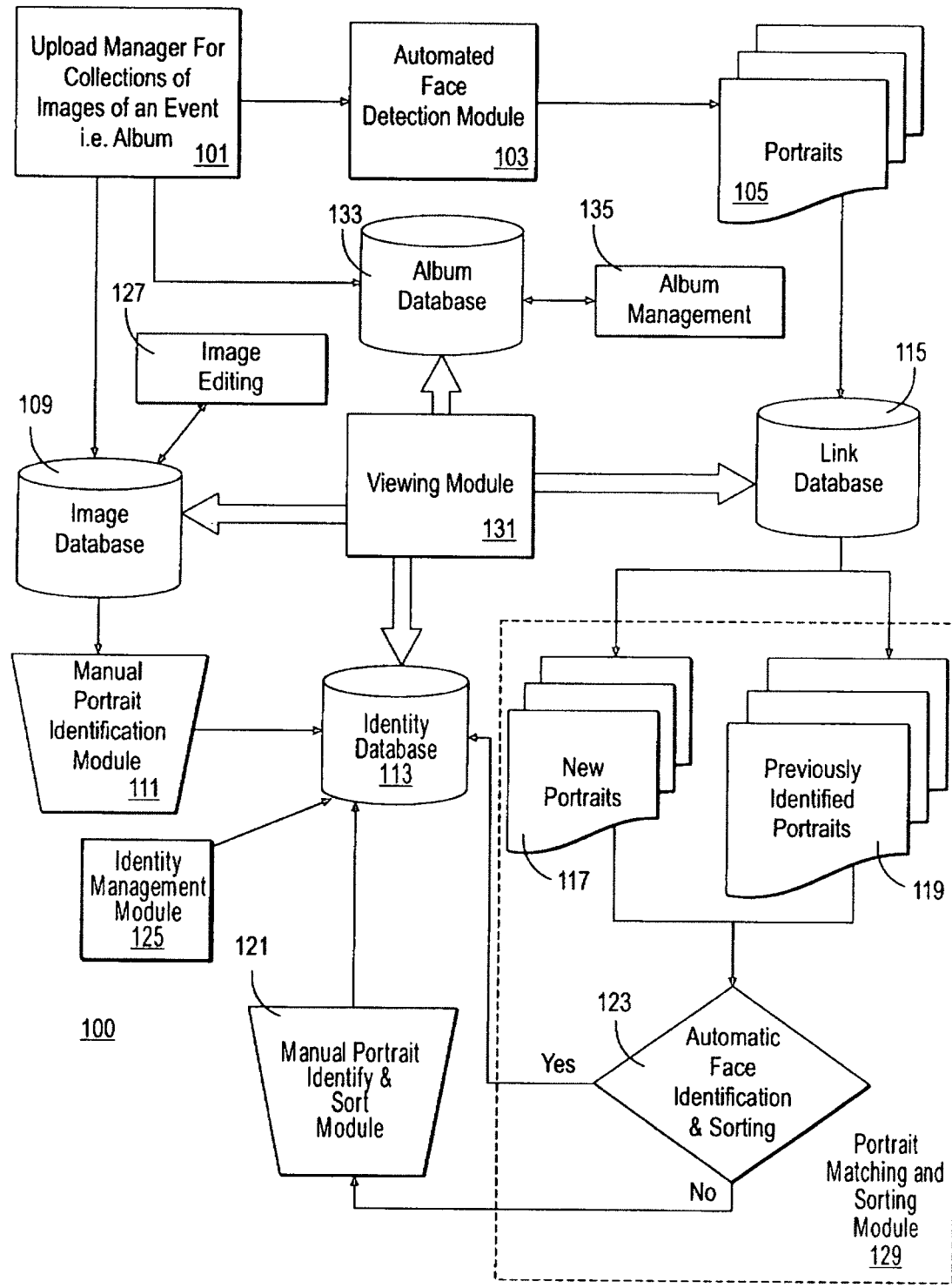
FIG. 1 is a diagram of one embodiment of an image management system.

FIG. 1 is a diagram of one embodiment of an image management system. In one embodiment, the image management system includes a set of databases, album management, face detection, identity linking, identify management, image editing, viewing and similar components and features. In one embodiment, these components, processes and features are provided as part of a remote server system. A user may access the system from a personal computer, workstation, console device, laptop, handheld device, cellular phone or similar device capable of accessing the servers over a network. In one embodiment, the user may access the system through a general purpose application such as a browser or similar application. In another embodiment, a specialized application may be utilized such as a browser modified for a handheld device, a purpose specific client or similar application.

In one embodiment, each user of a system may access the system resources through a personal or shared account. As used herein a user may refer to an individual with an account with the system. In contrast, a view, as used herein, may refer to an individual who is accessing the system to view images from a user's account. The user can upload pictures from the device he is accessing the system from or may send images on a physical media to an administrator of the system that may upload the images to the user's account. Each uploaded group of images may be identified as an album or event. As used herein an album may refer to an arbitrary collection of images. An album may also be related to an event, where each of the images in the album was captured during an identified event or in association with the event.

In one embodiment an upload manager 101 may handle the uploading of images into the system. The upload manager may facilitate the uploading of images from the device from which the user is accessing the system or an associated device. For example, a user may designate a set of images for upload on a personal computer as well as a set of images on a digital camera memory that is attached to the personal computer. The upload manager 101 organizes and manages the upload of these images to the system. The upload manager 101 may also obtain images provided to the system by an administrator. For example, a user may send the administrator of the system a memory card with images to be added to his account and an indication of the album or event that the images are to be associated with. As used herein an administrator of the system may refer to an entity and its agents such as a company that provides the system and services and its employees that administer the system.

The images provided to the system by the upload manager 101 may be stored in an image database 109. The image database 109 may be any type of database including a relational database, an object oriented database, or similar type of database system. The image database 109 may be responsible primarily for storing images uploaded to the system. The database may be housed in a single server or may be distributed and may have remote back up servers to guarantee the protection of the uploaded data.

Other data received with the images may be stored in an album database 133. This information may include a name for an album, times and dates for the images being uploaded, event information related to the uploaded images and similar information. The album database 133 may be any type of database including a relational database, and object oriented database or similar database. The album database 133 may be housed in a single server or may be distributed and may have remote back up servers to guarantee the protection of the uploaded data. An album management utility 135 may be a stand-alone application or module integrated with the system as a whole. The album management utility 135 may allow a user to manage data related to an album or event. This data may be associated with specific images or space multiple images.

In one embodiment, the upload manager 101 may also pass the uploaded images on to an automated face detection module 103. In one embodiment, the automated face detection module may utilize or include a cascade of boosted classifier working with haar-like features such as the OpenCV (Open Source Computer Vision) software by Intel Corporation, Santa Clara, Calif. The automated face detection module 103 may process each of the uploaded images to identify faces within each image. The automated face detection module 103 may search for all faces or similar features within each image. The automated face detection module 103 may detect any number of faces or similar features within each image and generate a portrait for each detected feature. For example, an image of a mother and daughter may be processed and the automated face detection module 103 may find two faces in the image and create a thumbnail or similar portrait for each face. These portraits 105 may then be forwarded to a link database 115 for storage.

In one embodiment, a link database 115 may further contain fields that are updated for linking portraits to identity, portraits to images and portraits to albums. The link database 115 may be any type of database system including a relational database, an object oriented database or similar database system. The link database 115 may be housed in proximity to image database 109 and other databases in the system. In another embodiment, the databases may be remote from one another. The databases may communicate with one another via a database management system, such as a relational database management system, over a network or over similar architecture. The link database 115 may be distributed over multiple machines and may be backed up to a remote location to protect the information stored in the database.

In one embodiment, a portrait matching and sorting module 129 may process the portraits in the link database 115 to match the faces to known identities or to similar looking faces of unknown identities. In one embodiment, the portrait matching and sorting module 129 may retrieve all portraits that have been previously identified 119 and all of the new portraits 117 that have been recently extracted and attempt to identify and match the new portraits 117 with previously identified portraits 119 using an automatic identification and sorting component 123. In one embodiment, all known portraits in the system may be used to identify newly received portraits. In another embodiment, only identified portraits associated with the account, or public portraits associated with the account or linked accounts or similar portraits are utilized to match the newly received portraits. In a further embodiment, a user or administrator may further limit the pool of previously identified portraits. For example, the user may specify portraits identified with a particular album, event or set of albums or events.

In one embodiment, the portrait matching and sorting module 129 may utilize Principle Component Analysis (PCA) a.k.a. Eigenfaces, a combination PCA and Linear Discriminant Analysis (PCA+LDA) or Bayesian Intrapersonal Extrapersonal Classifier (BIC). The portrait matching and sorting module 129 may also update the link database 115 to indude the matching information between a portrait in the link database and an identity in the identity database 113.

In one embodiment, the character information may be stored in a name or an identity database 113. Identity database 113 may be any type of database including a relational database, object oriented database or similar database system. Similar to the other databases, this database may be distributed, remote, networked or have similar architectural features. The identity database 113 may store data related to identities of individuals. As used herein an individual in an image may be referred to as a character and a set of characters associated with an album may be referred to as a cast of characters. Data related to a character that may be stored in the identity database 113 may include name, emails, relations with other characters (e.g., mother, wife, daughter etc.), account information, public or private settings, portraits in the link database 115, full images in the image database 109, associated albums in the album database 133 and similar data.

In one embodiment, portraits that are not identified may be processed by a manual portrait identify and sort module 121. The manual portrait identify and sort module 121 may generate an interface for a user to view a full set or subset of the portraits that were not matched. The manual portrait identify and sort module then receives identity information from the user and updates the link database of that portrait entry to link it to the identity database as identified by the user and stores the information in the link database 115.

In one embodiment, the system may include a manual portrait identification module 111. In some cases, the automated face detection module 103 may not recognize or identify each of the faces in an image. For example, an image may include a partially obscured face that is not identified as a face. A user may initiate the manual portrait identification module 111 to correct this type of error. The manual portrait identification module 111 may be used to create a portrait, link an image with an identity or similarly update the system information and link an image in the image database 109 with an identity of a character in the image in the identity database 113 by updating the link database 115

In one embodiment, the system may further include a set of utilities for managing data in the system. An image editing utility 127 may provide an interface to allow a user to edit images that have been stored in an image database 109. The image editing utility 127 may allow a user to rotate, crop, airbrush, paint, or similarly edit images stored in the image database 109.

In one embodiment, the system may further include an album management utility 135. The album management utility 135 may provide an interface to allow a user to edit information and the images that constitute an album. The album management utility 135 may provide tools for moving images between albums, creating new albums, deleting albums, linking albums with other albums, users or events, sharing albums and similar tools. The album management utility 135 may update the album database 133 or other databases as needed based on user input from the provided tools.

In one embodiment, the system may include an identity management module 125. The identity management module 125 may provide an interface and set of tools to manage the identity of characters associated with stored images and portraits. The tools may include interfaces for inputting and editing identity information including personal information such name, email, relation and similar information. The tools may also allow a user to select which images and portraits are associated with the character.

In one embodiment, the system may indude a viewing module 131. The viewing module 131 may provide an interface to access each of the databases to provide a range of services to a user including allowing a user to view an album, images and character information. The viewing module 131 may allow a user to view relationships between individuals through the presentation of images and portraits. The viewing module 131 may provide several interfaces for viewing and editing the relationships between individuals and events in the images of an album or account. These interfaces are discussed in greater detail in regard to the following figures. Each of these interfaces may be generated and provided through a web server or similar service to be accessed by a browser.

Figure 2A:
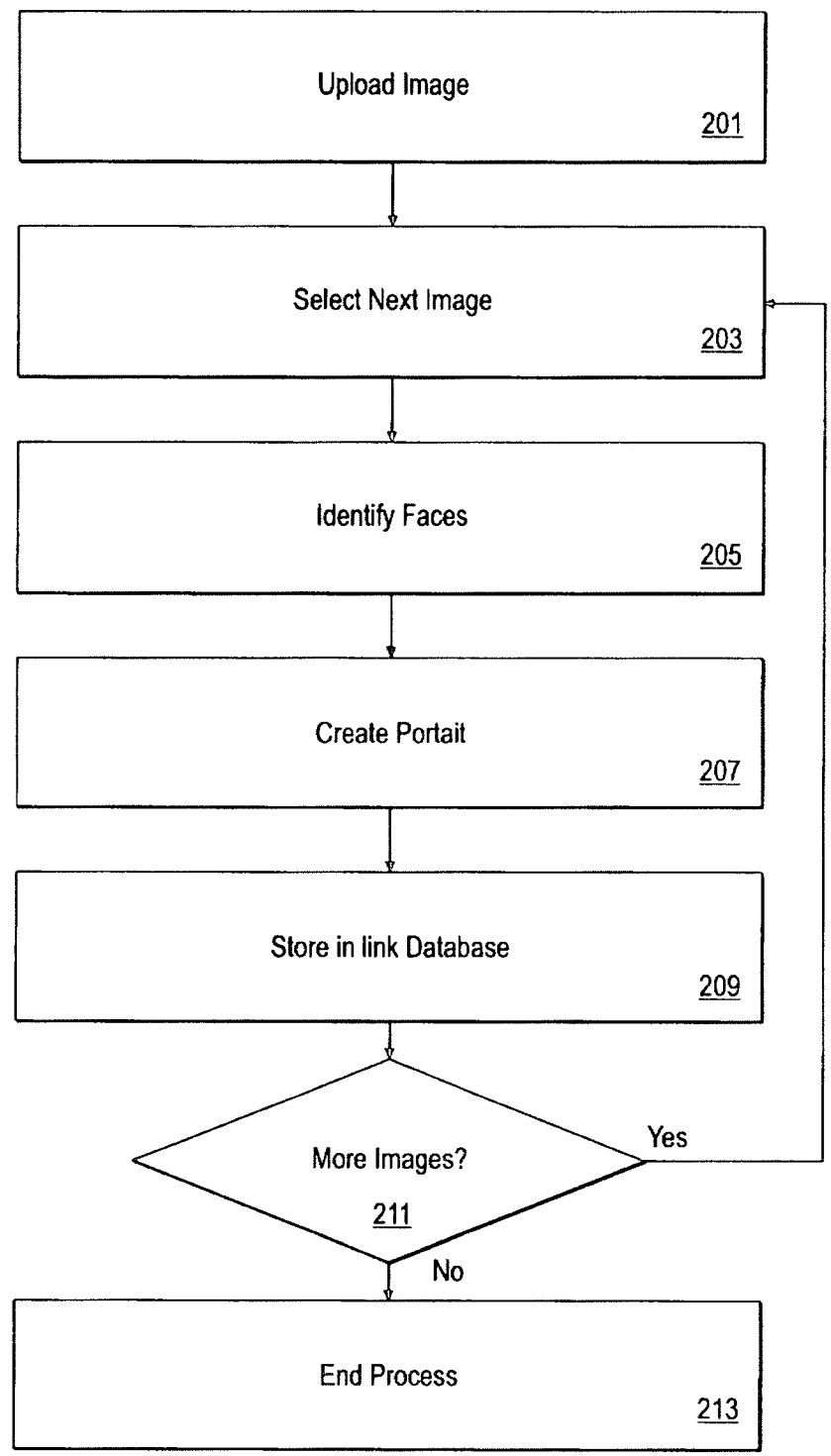
FIG. 2A is a diagram of one embodiment of a process for face recognition for uploaded images.

FIG. 2A is a diagram of one embodiment of a process for face recognition for uploaded images. In one embodiment, the system may initiate its processing of images during an upload of the images into the system (block 201). The upload process may be between a local client such as through a browser interface or at the remote server through a server application utilized by an administrator or through a similar process. The images may be input in the system in any format. The images may be stored in computer readable media such as fixed disks, tape drives or similar storage media. The data may be formatted and organized to be stored in a database or set of databases such as an image database.

In one embodiment, the system may process the images one at a time or may process the images in batches or in parallel. The system may select a next set or individual image to process (block 203). The images may be processed in a first in first out manner, may be selected based on available resources or similarly processed. For example, some images may be larger or at a higher resolution and more computationally intensive to process. The system may distribute the processing of these images or similarly allocate resources to the processing of uploaded images.

In one embodiment, the received images may be processed to detect faces or similar elements in the images (block 205). The images may be of a character or set of characters. The system attempts to identify each of the characters in the images to allow the user to view the images based on the character being present and to easily see relationships between characters in a set of images. The system may identify the individuals by their faces using PCA or similar techniques. In another embodiment, other features may be used to detect characters including, clothing (e.g., a hat) or other distinguishing features (e.g., hair, scars, glasses, etc.). In further embodiments, the system may be used to detect and categorize items other than characters. For example, the system may be used to detect and/or identify animate or inanimate objects. The same types of relationships between items may be drawn for these items as are determined for characters. For sake of clarity, the embodiments described herein relate to the identification of characters.

In one embodiment, the process may find a single face or a set of faces in each image. The process may create a separate portrait for each of the faces (block 207). A portrait may be a cropped area of the image, a thumbnail or similarly reduced image. The portrait may be framed to include the user's face, upper body or whole body. The portrait may be created in any format including a GIF, JPEG or similar format.

The portraits may be stored in the link table (block 209). The portraits may be stored along with contextual information and link information. For example, the portraits may be stored with information indicating the image they were extracted from, an event or album associated with the image, information about other portraits and similar information. This data may be organized to fit a schema of a database or into objects for an object oriented database.

In one embodiment, the process may check if additional images or sets of images are available to be processed (block 211). If there are additional images to be processed, then the next set or image may be selected (block 203). If no other images are available to be processed the process may idle until more images are input or the process may exit or end (block 213).

In one embodiment, this process may be executed or supported by the upload manager discussed in regard to FIG. 1.

Figure 2B:
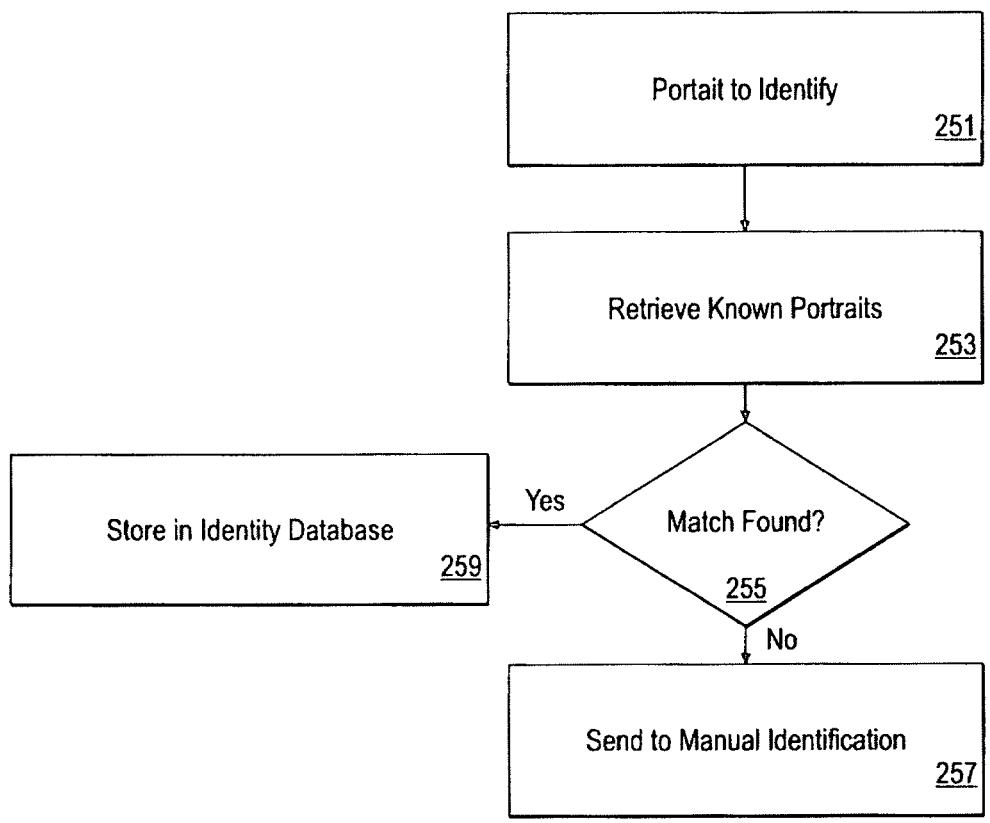
FIG. 2B is a diagram of one embodiment of a process for portrait matching.

FIG. 2B is a diagram of one embodiment of a process for portrait matching. In one embodiment, the portrait matching process may be initiated when new portraits are generated or may run continuously waiting for new portraits to be stored in the link database for processing (block 251). The process may process new portraits one by one or in sets from the link database to start the matching process. The portrait matching process may access a set of previously identified portraits from the link database and may obtain identity information for each of the identified portraits from the identity database (block 253). Each new portrait may be compared to each identified portrait iteratively or the new portrait may be scored, or similarly processed to generate an abstracted value or set of values associated with the new portrait. This data may be compared with similar data for identified portraits (block 255). A group of previously identified portraits for the same character may be averaged together for purposes of comparison with the new portrait.

In one embodiment, if the new portrait is a match with a previously identified portrait based on identification of similar features or similar scoring of the portraits then the new portrait may be considered a match. If a complete search is made and no match is found then the new portraits will be sorted with similar faces to facilitate the manual identification and then it may be forwarded to the manual identification module to be identified (block 257). If a match is found during the search then the information related to the new portrait may be updated in the link database with information from the identity database (block 259). For example, identity information may be modified to add another link to an associated picture and to further define a set of images associated with a character. After a portrait has been processed the process may check to determine if there are additional images to be processed (block 257). If there are not any further portraits to process the portraits matching process may idle and wait for more input or may exit or end. If there are additional portraits to be processed, then a next set of portraits may be selected for processing and the process reinitiated (block 251).

Figure 3:
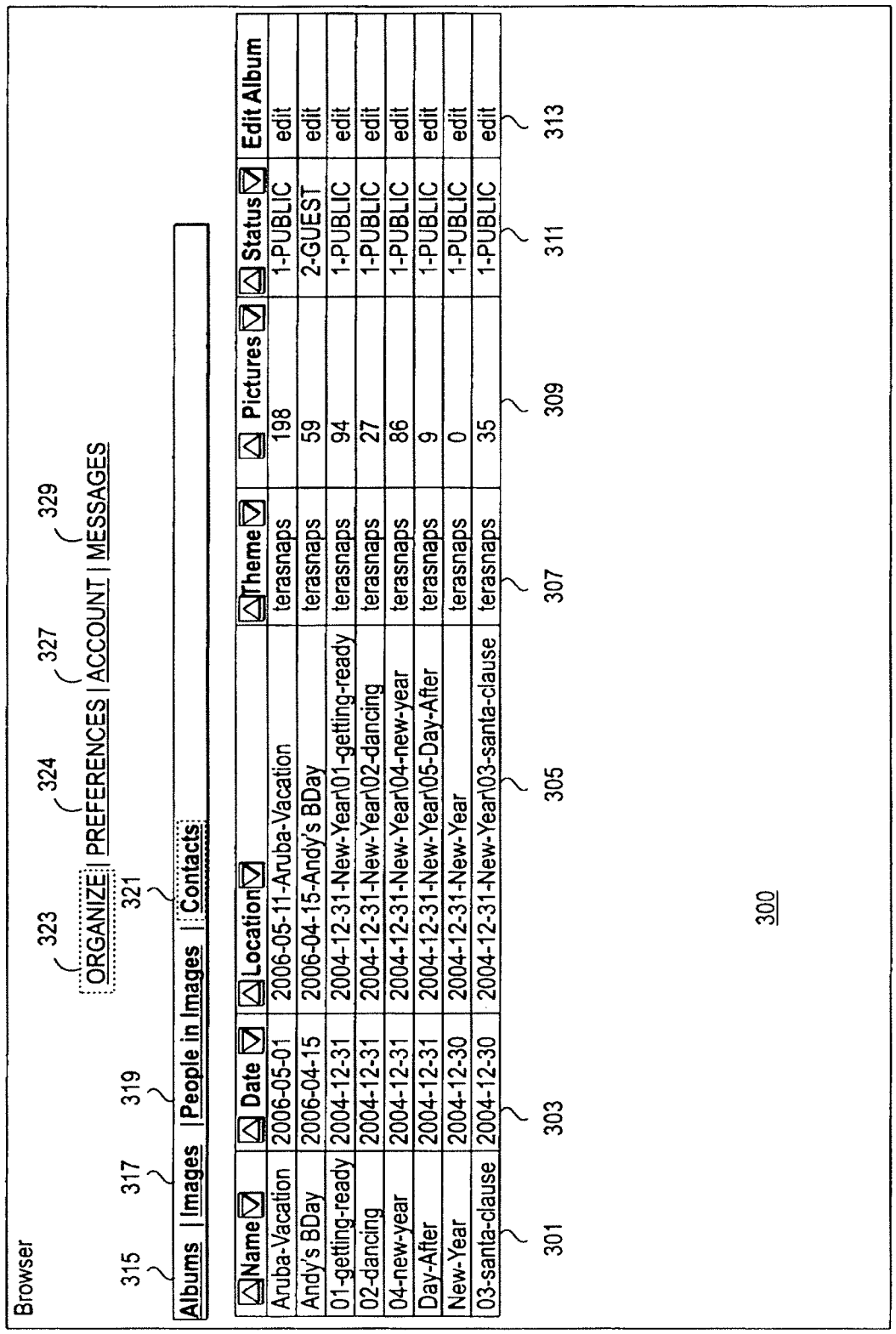
FIG. 3 is a diagram of one embodiment of an interface for album listing.

FIG. 3 is a diagram of one embodiment of an interface for showing an album listing. In one embodiment, the interface may be generated as a web page or extensible markup language (XML) document for display through a web browser or similar application. In another embodiment, the interface may be a part of a specialized application or similar client.

In one embodiment, a user may log into his account through a standard log in process and be provided with a set of navigation links and content through the interface. For example, the interface may provide a set of navigation links related to organization 323, preferences 324, account information 327 and messages 329. These navigation options may be a high level set of options that are always or nearly always available when navigating the interface. The organize link 323 may provide access to other interfaces related to the organization of images, albums or identities. The preferences link 324 may provide access to a preferences interface that allows a user to set display preferences, navigation preferences and similar preferences related to the system. The account link 327 may provide access to information about the user's account including password and login information, account billing status, order status for purchases through the interface and similar information. The messages link 329 may provide access to an interface for a system email interface or similar communication interface for sending and receiving messages from the system administrators and other users.

A set of additional navigation links that may be page or interface specific may also be provided. For example, in an album overview interface links may be provided to albums 315, images 317, people in images 319, contacts 321 or similar links. The albums link 315 may provide access to the album overview listing 300 or similar album related interfaces. The images link 317 may provide access to image editing and viewing interfaces. The contacts link may provide access to contact list viewing and editing interfaces.

In one embodiment, the interface may present an album overview listing 300. The album overview listing 300 may provide a table or similar layout of information relating to the albums of the user stored within the system. The table or similar layout may provide a list of album names 301, the date on which the album was created 303, a location or description associated with an album 305, a theme of the album 307, the number of pictures 309, a sharing status of the album 311 and similar information.

Some information about the album may be automatically collected and updated. For example, the number of pictures 309 in an album may be tracked by the system and provided automatically. Other information is determined by the user at the time the album is created. For example, a user may designate the theme and sharing status of the album when created. A theme may be a layout scheme or similar organizational scheme for viewing or accessing the album information including images. The system may provide a number of preset themes for the user to choose from. The sharing status is an indication of which viewers may have access to the album. The user may restrict access to specifically designated viewers or defined groups of viewers, to just the user, or may make the album publicly accessible.

Figure 4:
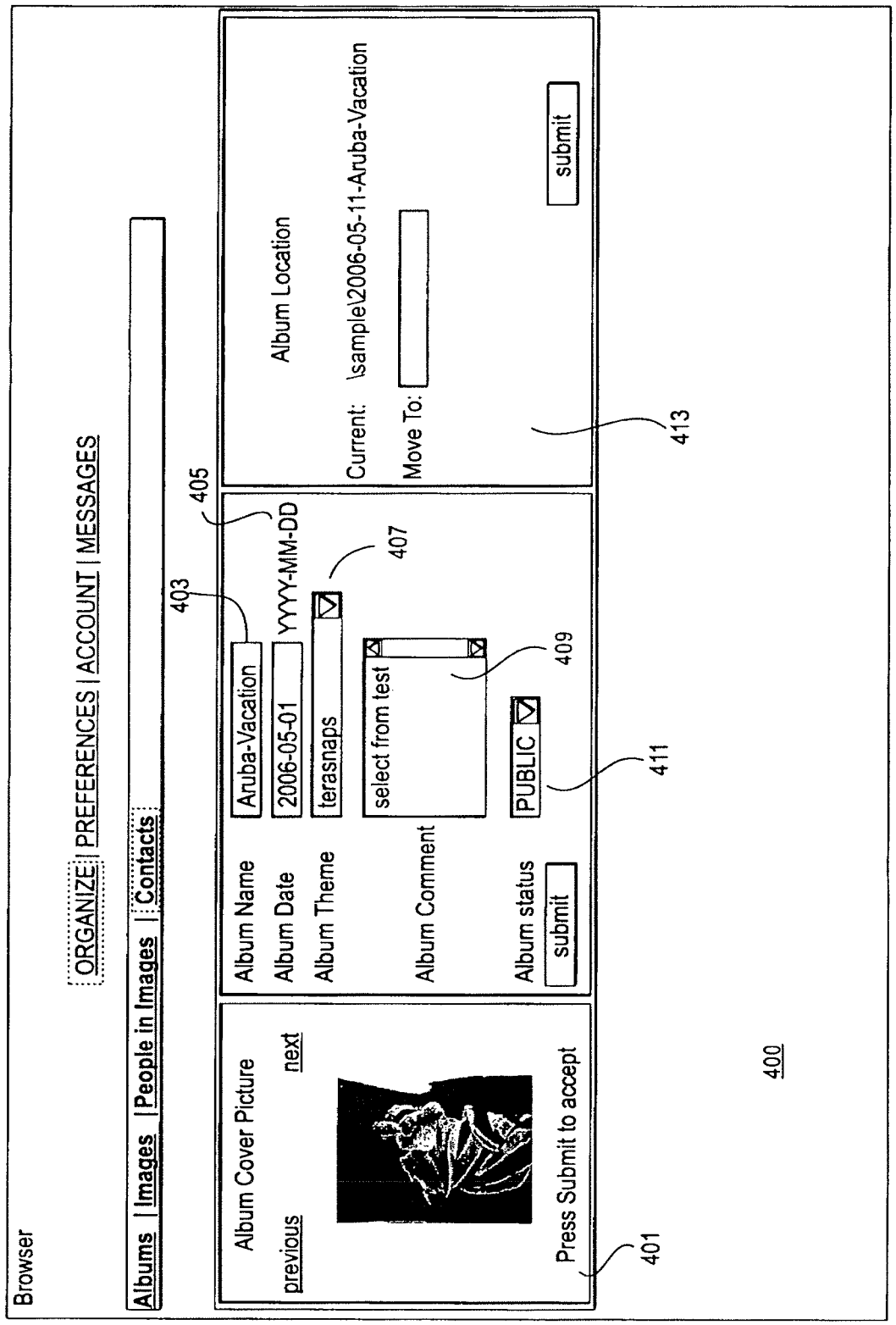
FIG. 4 is a diagram of one embodiment of an interface for album editing.

An edit option 313 may be provide to allow the user to change descriptive information and characteristics of the album. FIG. 4 is a diagram of one embodiment of an interface for album editing. In one embodiment, the album editing option may be used to access an album editing interface 400. The album editing interface 400 may provide the user a set of graphic user elements or similar interface for viewing and changing the characteristics and information related to an album.

In one embodiment, the album editing interface 400 may allow a user to select an album cover image 401. The image selection element 401 may allow a user to see a thumbnail or similar representation of images in an album. The user may cycle through these images to select a desired image to represent the album. In another embodiment, a separate interface such as a pop up window may be presented to show all available images for selection.

In one embodiment, text windows, drop downs, radio buttons and similar input mechanisms may be used to allow a user to specify an album name 403, an album date 405, album theme 407, comments 409 and album sharing status 411 and similar characteristics of the album. In one embodiment, a user may view and update the location information 413 where the images are stored on a local drive to initiate an upload process or a synching process. A synching process may check the local storage device to see if new images for the album have been added. The interface may allow a user to update the location information 413.

FIG. 5 is a diagram of one embodiment of an interface for viewing an album organization overview 500. In one embodiment, an interface may be provided to show an overview of the organization of the albums of the user. In another embodiment, this overview may be combined with other album overview information.

The album organization overview 500 information may include the album name 501, the album date 503, the number of pictures in the album 505, the number of faces recognized and matched with an identity in the images of the album 507, the number of unmatched faces 509, a completion statistic 511 (e.g., the percent of matched faces from the total number of detected faces) and similar information. The album organization overview 500 may also include links to a people organization interface 513, an image editing interface 515 and similar information or interfaces.

Figure 6:
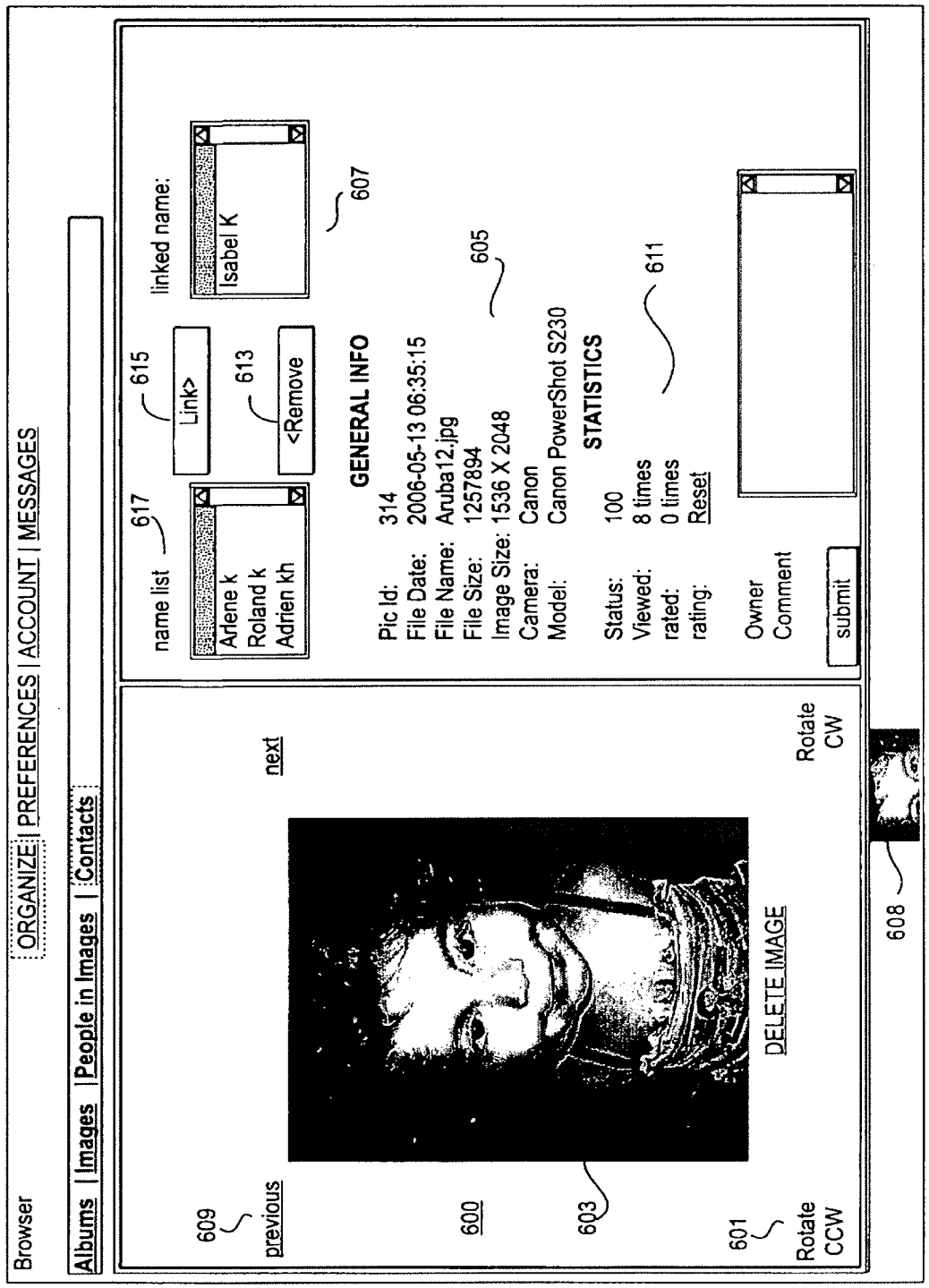
FIG. 6 is a diagram of one embodiment of an interface for image editing.

FIG. 6 is a diagram of one embodiment of an interface for image editing. In one embodiment, this interface may be reached from the album organization overview 500 described in FIG. 5 through the image edit button. The image editing interface allows a user to make changes to an image and manage the information related to the image.

In one embodiment, the image editing interface 600 may display an image 603 to be edited. The image editing interface 600 may provide a set of tools 601 for editing the image 603. The tools may include rotation of the image, resizing of the image, airbrushing, color adjustment and similar image editing tools. The user may also use the interface to cycle through the images of an album or other sets of images associated with a user account using image navigation links or tools 609.

In one embodiment, the image editing interface 600 may also display information about the image including image characteristics 605 such as an image identification number, image file date, image file name, image file size, image dimensions, GPS location, type of imaging device that generated the image and similar information that are in an EXIF portion of all digital images. The image editing interface 600 may also provide information about the usage of the image including statistics 611 on the number of times the image has been viewed, ratings, shared status, comments and similar information.

In one embodiment, the image editing interface 600 may also be used to manage the characters that are linked to the image. These are the characters that are pictured in the image. In one embodiment, the automatic processing of the image during upload may have matched the faces in the image to characters that are already known. The known characters may be listed as linked names 607. The interface may allow the user to remove 613 or add 615 names 617 as necessary to correct errors or oversights of the automated detection and matching processes.

In one embodiment, each portrait 608 associated with the image may be displayed. The portraits may be associated with the linked characters associated with the image.

Figure 7:
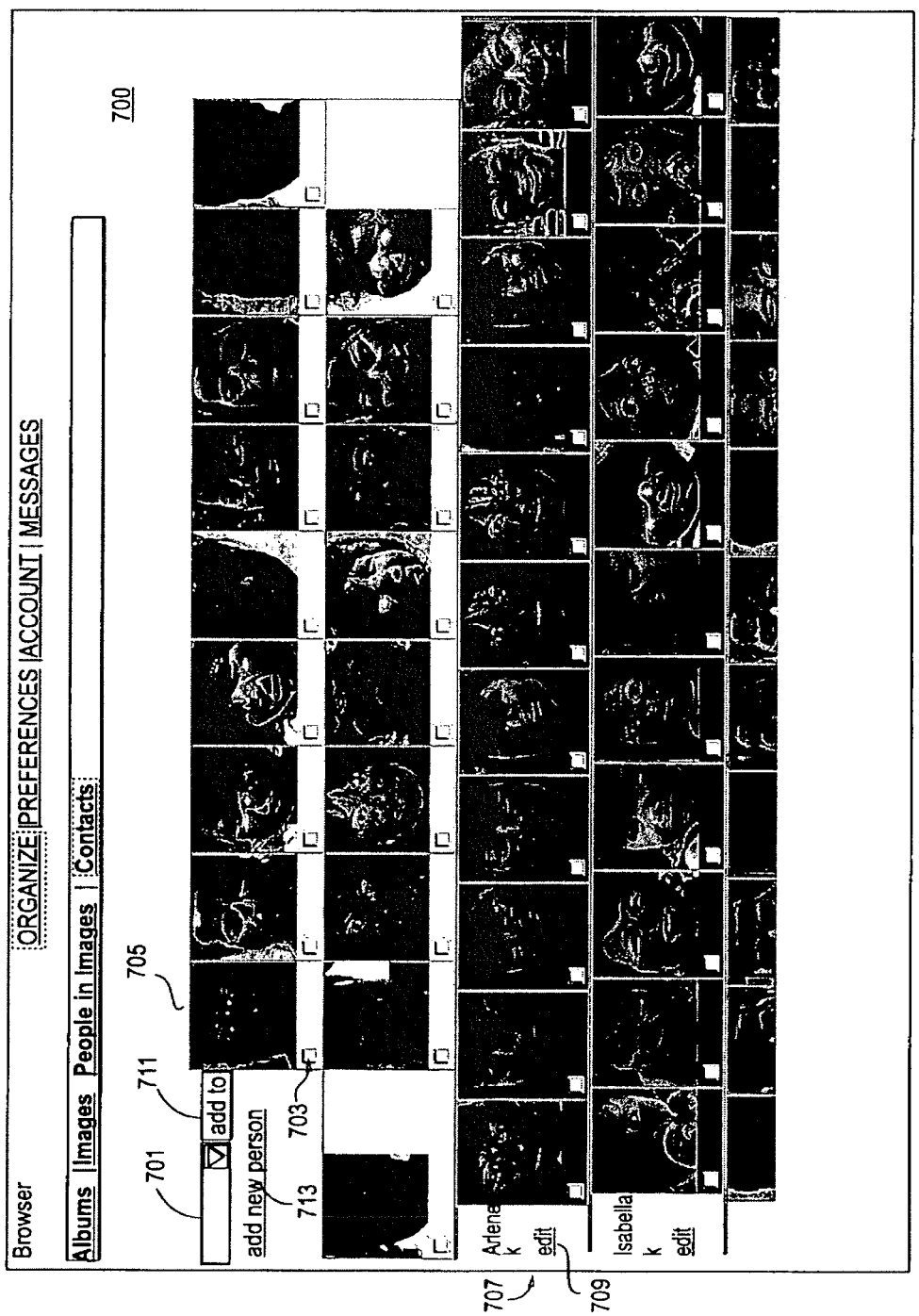
FIG. 7 is a diagram of one embodiment of an organization interface for editing unmatched and matched portraits.

FIG. 7 is a diagram of one embodiment of an organization interface for editing unmatched and matched portraits. In one embodiment, the organization interface 700 may be used to edit the matching of portraits to identities.

In one embodiment, the organization interface 700 may display all or a subset of the portraits 705 that were detected in the uploaded image but not matched with a character. The organization interface may also display all or a subset of the images or portraits 707 associated with each character known to the user or the album. The organization interface may also display all or a subset of images that are similar looking in the uploaded images but otherwise not matched to a character. The user may utilize the organization interface 700 to match portraits to characters. For example, the user may select a character from the individual selection element 701 and select each of the unmatched portraits that correspond to the character by clicking on the portrait, a check box 703 for the portrait or similar element and selecting a confirm or add button 711. A new character may be defined by selection of an add new character or person element 713.

In one embodiment, the organization interface 700 may also be used to edit the set of characters and their portraits already matched with an identity. A user can add, remove or reassociate portraits using an edit character contact interface element 709. The edit user interface element may bring up the editing interface discussed below in regard to FIG. 9 or a similar interface.

FIG. 8 is a diagram of one embodiment of contact list for a user account. In one embodiment, the system may provide a contact list interface 800 for viewing a list of characters associated with the user account. This list of characters may be a list of friends, family, acquaintances or similar individuals known to a user. These characters may appear in the images and albums of the user.

In one embodiment, the contact list interface 800 may have a table layout or similar layout. The contact list interface 800 may display the characters name 801, including last and first name, a nickname 803, email address 805 or other address or contact information (e.g., phone number, work number, home number, etc.), a number of images of the portraits associated with the account or public images of the character across multiple accounts and similar information. In one embodiment, the contact list interface 800 may include elements 809 linking the characters in the list to a character contact editor and a presentation of images associated with the character or other interfaces of the system.

In one embodiment, the character contact information may be used to detect and link characters between different user accounts. The system may detect matching contact information such as matching email addresses that allow the system to determine that there is a match between characters across user accounts. This information may be used to find publicly available or user accessible images of the character in the other account and include them in the generation of dynamic albums or determination of relationships of images between the accounts.

Figure 9:
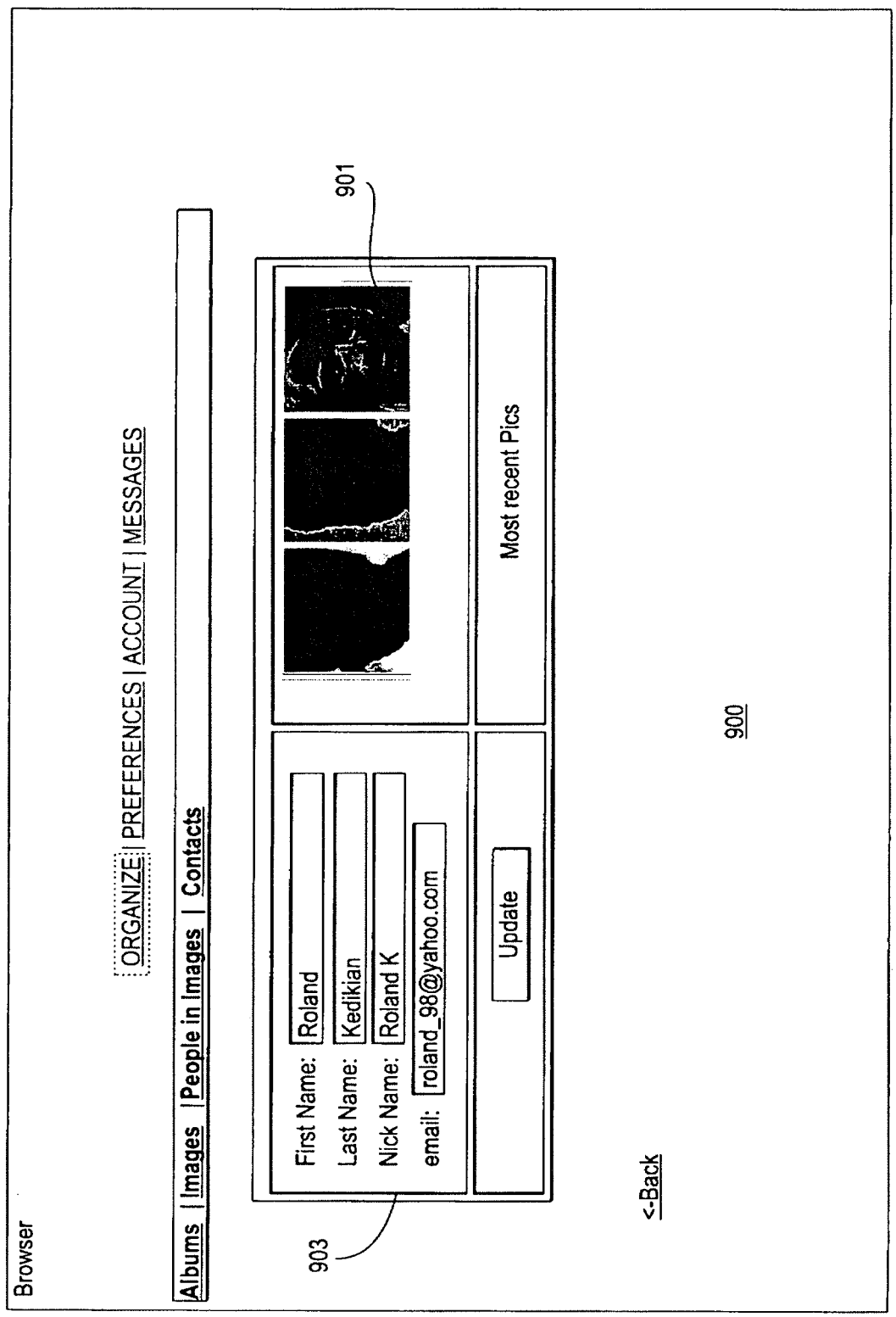
FIG. 9 is a diagram of one embodiment of a character contact editor.

FIG. 9 is a diagram of one embodiment of a character contact editor. In one embodiment, a character contact editor 900 may be reached from other interfaces (e.g., from the contact list interface) to allow a user to update the personal information associated with a character. In one embodiment, the character contact editor 900 may provide a set of text fields or similar user interface elements 903 to allow a user to update the name, nickname, email address and similar contact information for a character.

In one embodiment, the character contact portraits may be displayed or a subset of the portraits or images of the character may be displayed (e.g. recently added portraits). A user interface element may be provided to link the contact list interface 800 to the image editing or the organization interfaces to modify the associated images and portraits.

Figure 10:
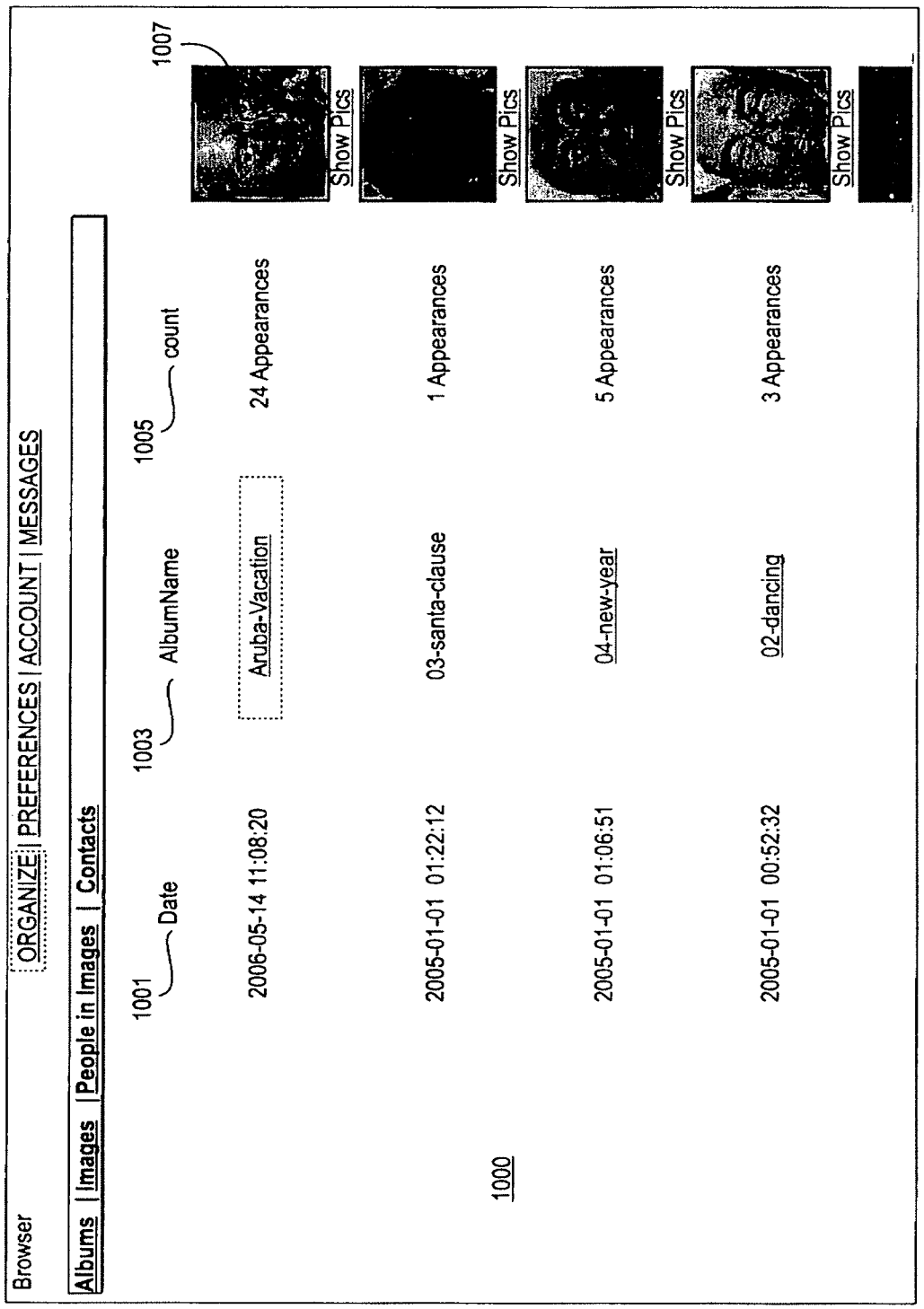
FIG. 10 is a diagram of one embodiment of a character images listing.

FIG. 10 is a diagram of one embodiment of a character images listing. In one embodiment, a character images listing interface 1000 may be reached through the character contact listing interface or character contact editor or other interfaces. In one embodiment, the character images listing interface 1000 may display information related to the images of a character including date of a related album 1001, an album name 1003, number of images of the individual 1005, a user interface element to link to the images 1007 or similar information and elements. In one embodiment, a thumbnail or similar representative image such as a portrait from the set of images may be shown as a representative image from the album.

Figure 11:
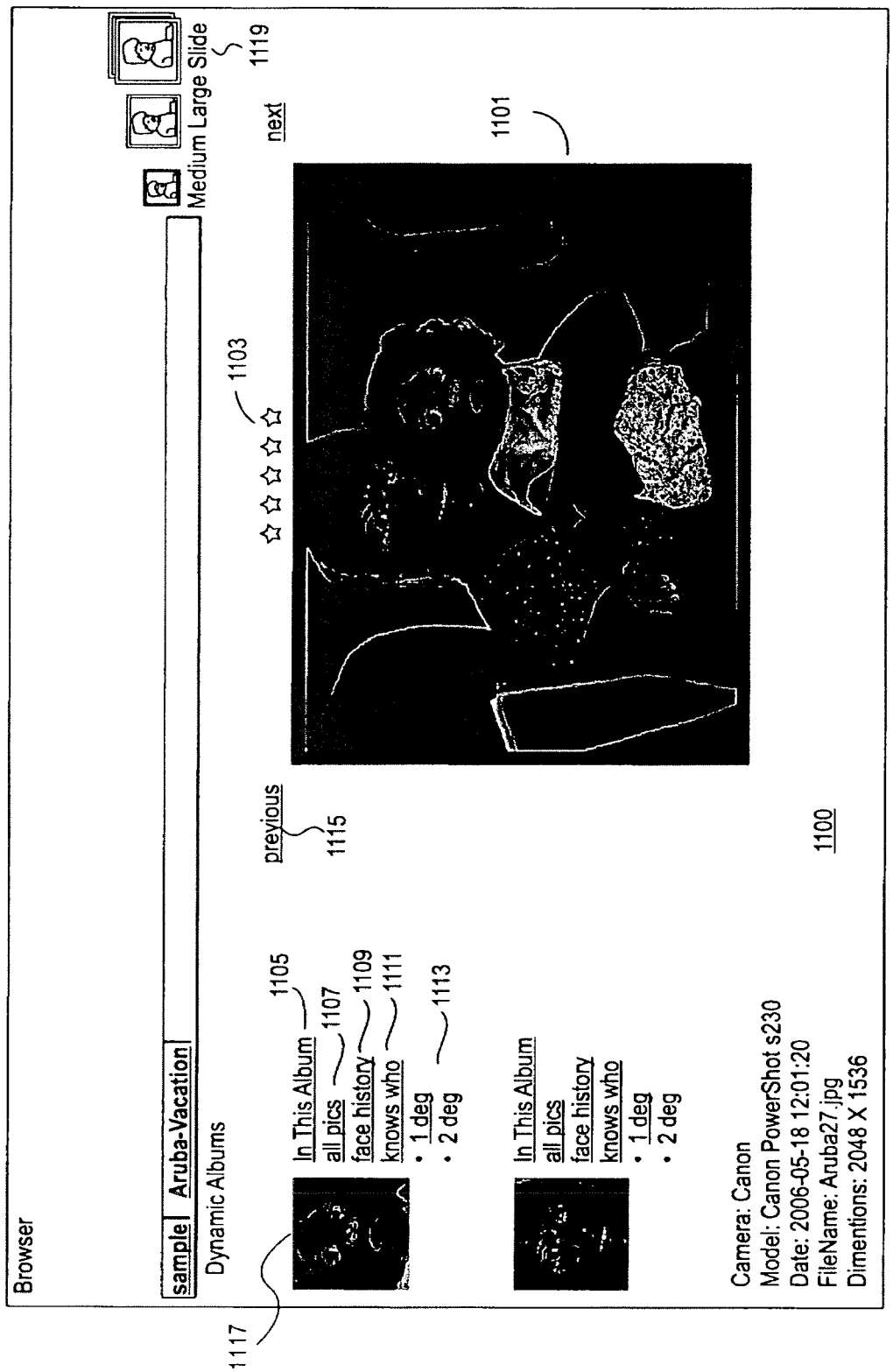
FIG. 11 is a diagram of one embodiment of an album viewing interface.

FIG. 11 is a diagram of one embodiment of an album viewing interface. In one embodiment, an album viewing interface 1100 may be accessed by selecting an album to view from the various album listing interfaces. A user may also view dynamic albums using this interface. As used herein a dynamic album is an album that is generated dynamically from a collection of pictures across one or many albums or across one or many users based on particular criteria using tools provided by the system (dynamic generation as used here is different and should not be confused with a dynamically generated xml page of otherwise static images information). For example, a user may view a dynamic album of all images of a particular character or all images containing any one of a cast of characters.

In one embodiment, the album viewing interface 1100 may display images 1101 one at a time in a slide show type format or similar format. In another embodiment, multiple images may be displayed simultaneously in a grid pattern or similarly displayed. A user or viewer may designate a format for displaying images and similar information by selecting a theme.

In one embodiment, an image may have a rating meter 1103 such as a star rating or similar rating mechanism. A user, permitted viewer or the public may be able to view and provide a rating of each image. The user may also select the type of rating mechanism and any related description indicating the meaning of the rating. The album viewing interface 1100 may also provide image advancement or viewing controls 1115 that allow a user or viewer to cycle through the images of an album or similarly navigate the images of an album. In one embodiment, a control 1119 may be provided to set or adjust the size of the displayed image. For example, the user or viewer may set the images to be shown in small, medium or large formats.

In one embodiment, each image may have related information displayed through the interface. In one embodiment, each of the characters in the image being displayed may be shown by the portrait 1117 from the image. A user interface element may be provided to allow a viewer to access additional information and images related to the character. In this manner, the albums may become dynamic as the viewer is able to define the images to be viewed and navigate the available images based on the identity of the users in the images.

In one embodiment, other user interface elements may provide access to other images of an individual in the 'In This Album' element 1105, show all images of an individual 1107, show a timeline or history of portraits for a character 1109, show a listing of other characters that this character knows or has appeared in an image with the 'knows who' element 1111, show a listing of characters that have appeared in images of other characters that this character has appeared with in images with the degree of separation elements 1113. Any number of degrees of separation may be selected to show relationships or associations with other characters and the images they appear in.

Figure 12:
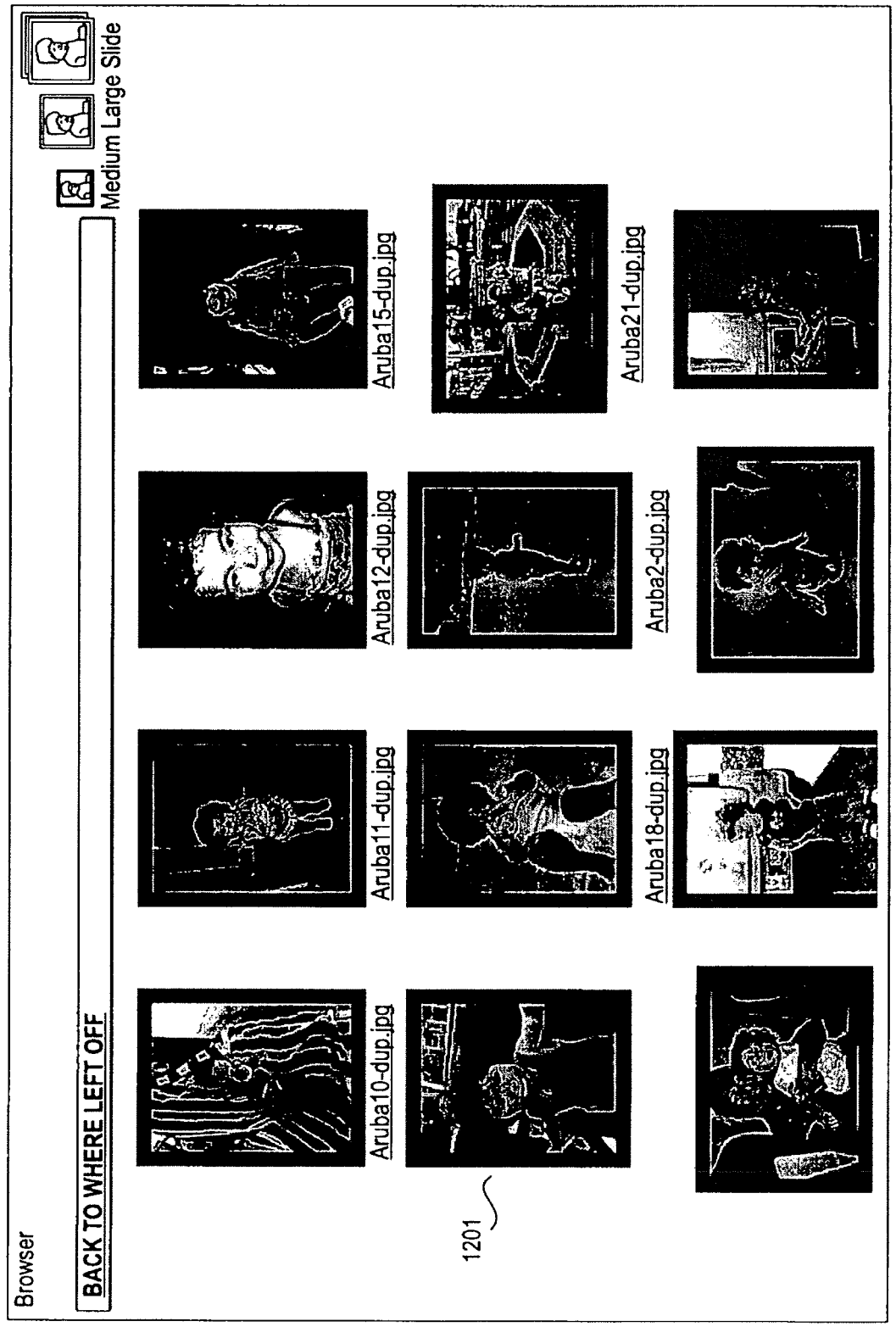
FIG. 12 is a diagram of one embodiment of an interface for displaying images.
Figure 13:
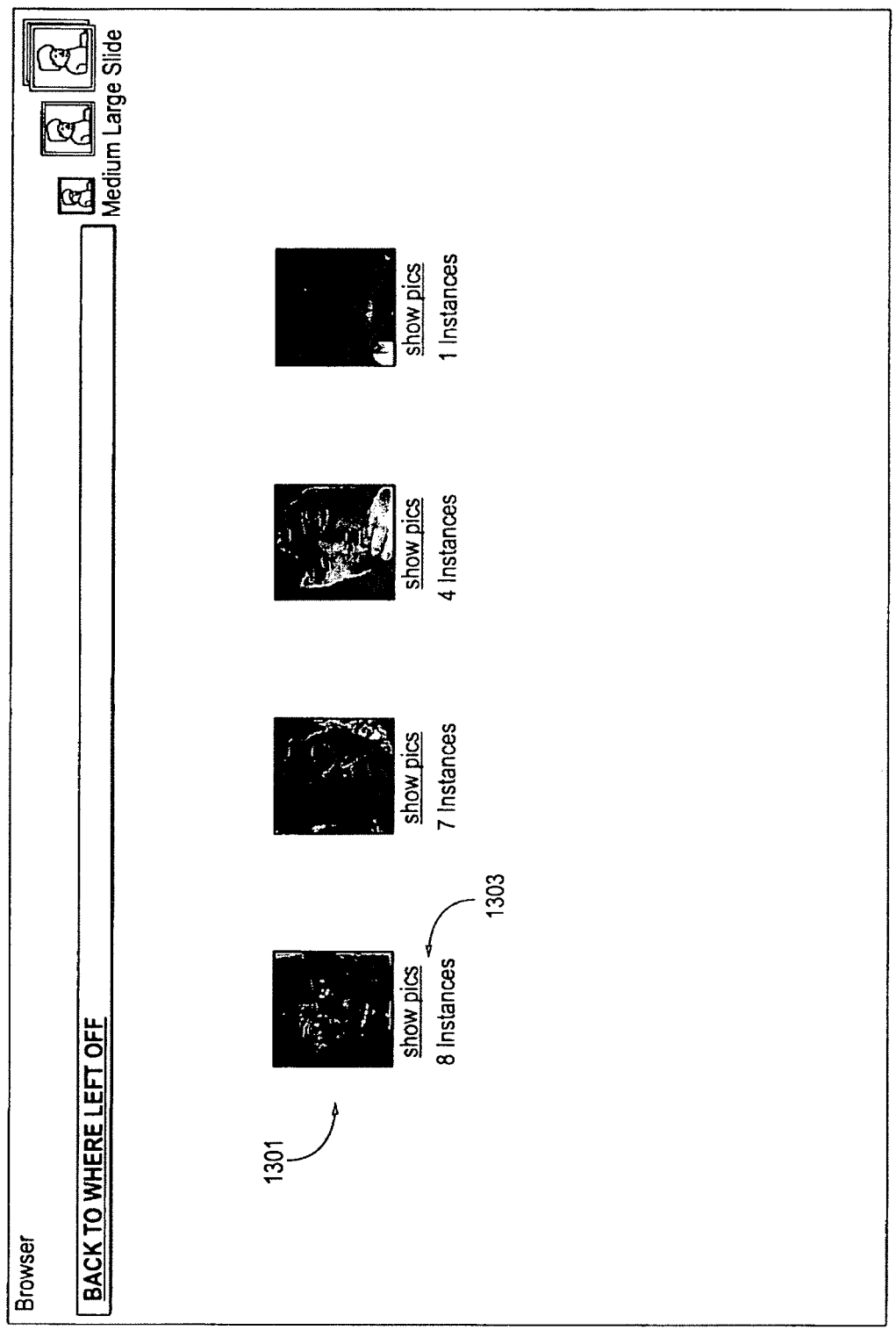
FIG. 13 is a diagram of one embodiment of an interface for viewing a list of characters that are known to a selected character.

FIG. 12 is a diagram of one embodiment of an interface for displaying images. In one example, a user or viewer may select to see all images of a character in an album or all images of a character available in an account or publicly available. The images may be displayed in a grid like pattern 1201 or may be displayed as a slideshow or similarly displayed. For example, this interface may be reached by the selection of the 'In This Album' element 1105 described in FIG. 11. FIG. 13 is a diagram of one embodiment of an interface for viewing known characters. In one embodiment, an interface for presenting a set of characters who have appeared in an image with a selected character may be accessed through a 'knows who' element 1111 described in FIG. 11 or similar user interface element. In one example embodiment, an image or portrait 1301 may be displayed to indicate each known character along with a user interface 1303 to access the images of each character may be provided. In one embodiment, other information about each character may be provided such as name, number of images, contact information or similar information. In a further embodiment, a mechanism may be presented for selecting multiple characters to find images with each of the selected characters.

Figure 14:
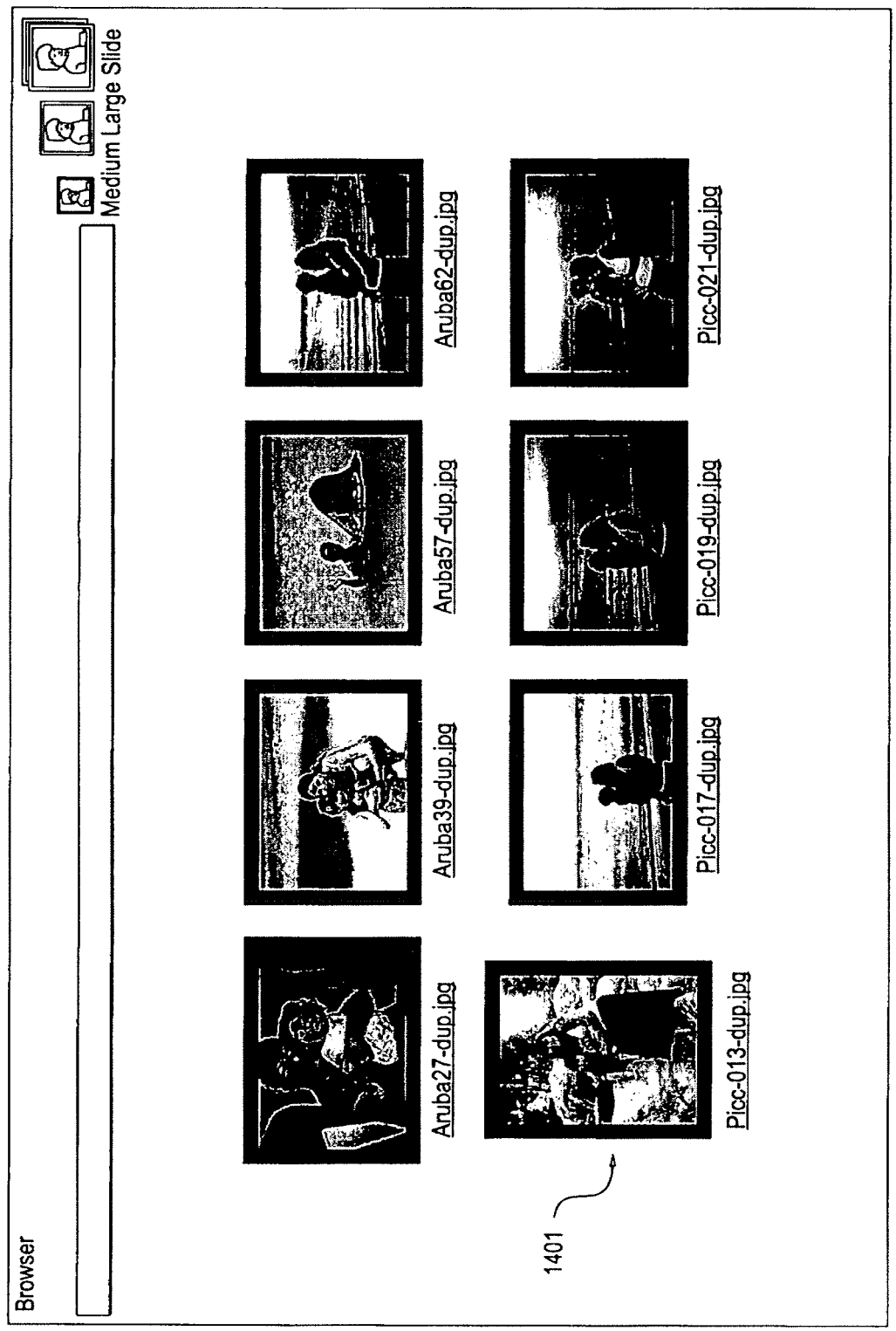
FIG. 14 is a diagram of one embodiment of an interface for viewing images of known characters in combination.

FIG. 14 is a diagram of one embodiment of an interface for viewing images of known characters. In one embodiment, a user or viewer may view a set of images 1401 with two or more designated characters. For example, these images may be selected by using the 'knows who' element 1111 described in FIG. 11 and selecting one or more characters from the user interface 1303 described in FIG. 13. These images may be displayed in a grid patter, slideshow or similar layout or presentation.

Figure 15:
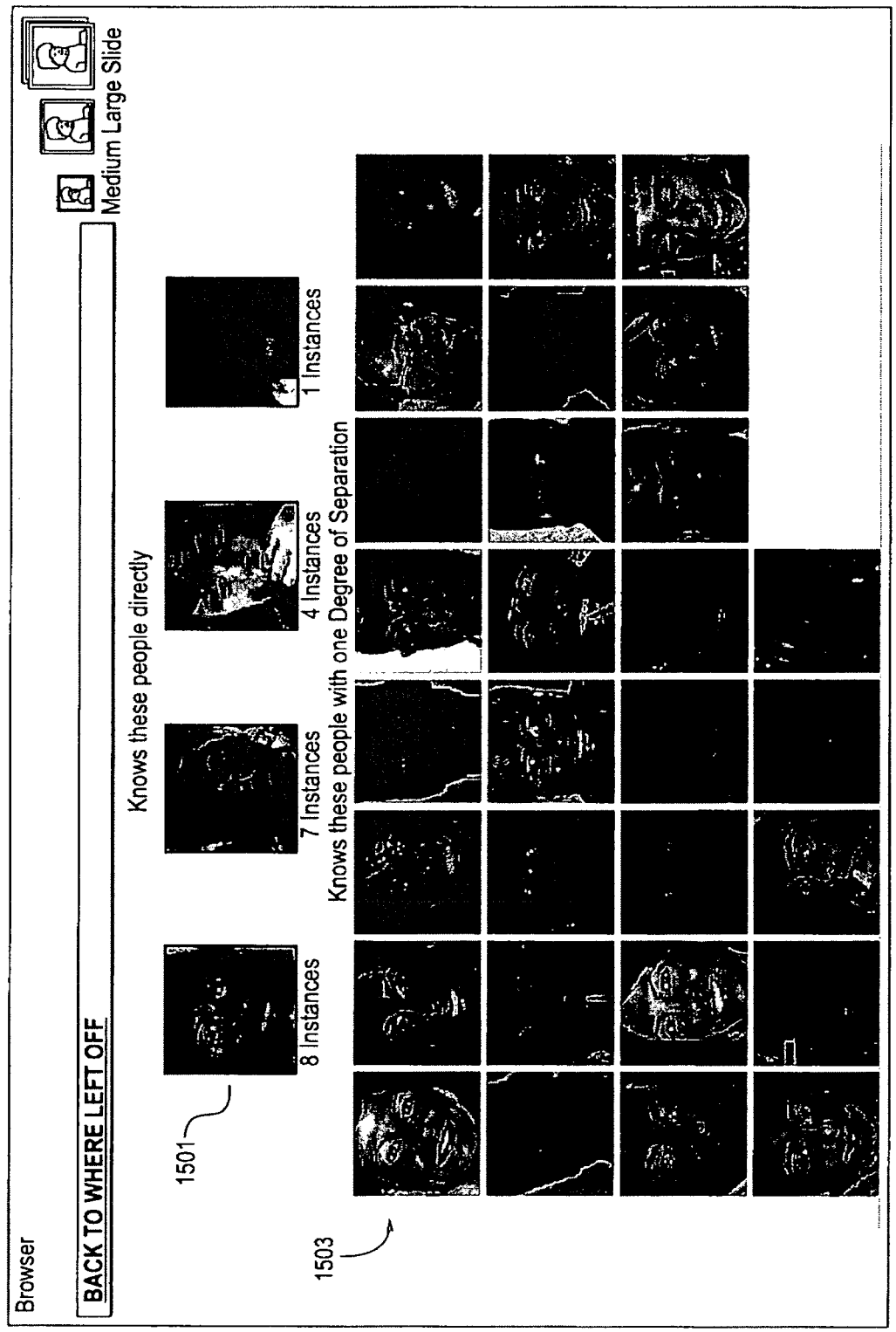
FIG. 15 is a diagram of one embodiment of an interface for viewing characters known by their degree of separation.

FIG. 15 is a diagram of one embodiment of an interface for viewing characters known by their degree of separation. In one embodiment, the system may generate an interface for viewing each of the characters indirectly known to a selected character by the degree of separation. This interface may be accessed through the viewing interface by selecting a degree of separation to be viewed with the degree of separation elements 1113 described in FIG. 11.

In one embodiment, the degree of separation interface may display portraits, images or other representations of directly and indirectly known individuals. These images or representations may be displayed in any order or layout. In one example embodiment, a set of individuals who are known directly to a selected character may be shown at the top of the interface 1501. Characters known at each additional degree of separation may be shown in a section below 1503 in order of the degree of separation from the selected character or in a similar layout.

Figure 16:
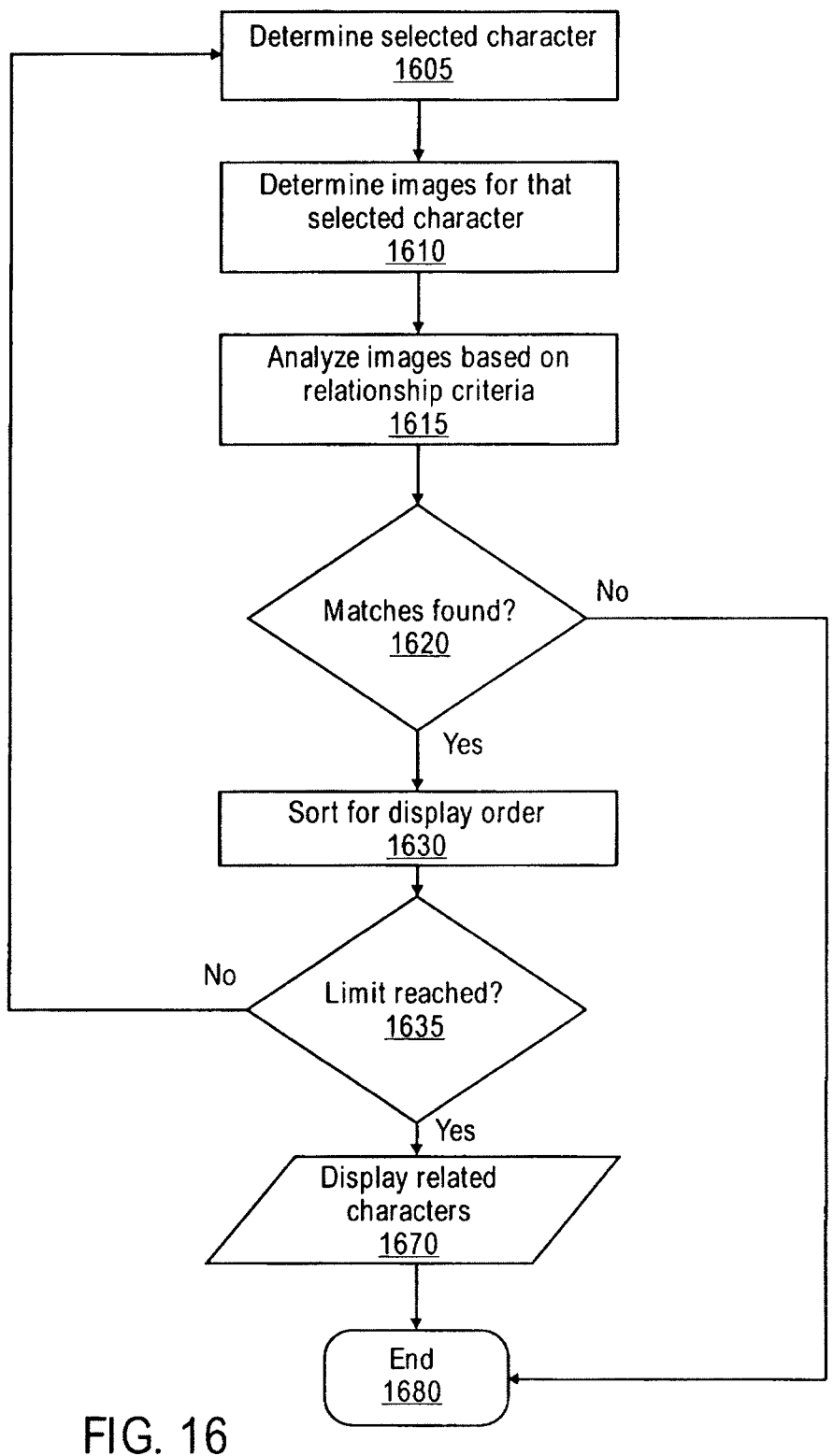
FIG. 16 is a diagram of one embodiment of a process for determining a set of characters related by degrees of separation for display.

FIG. 16 is a diagram of one embodiment of a process for determining a set of characters related by degrees of separation for display. A user may view related characters of a selected character in the system. The character may be selected by using a navigation link of the user interface. The process determines the set of related characters where the relationships can be defined by any criteria. For example, the set of related characters may be the social acquaintances of the selected character. In this manner, an order of connection, referred to herein as a degree of separation, may be determined for the selected character and other known characters in the link database.

In one embodiment, the relationship between one character and another character is based on whether both characters are depicted in the same image. Although in this embodiment the relationship is defined as whether two characters are depicted in the same image, the system may define other relationships to establish connections between characters. For example, a relationship could be defined as whether two characters are business acquaintances or whether two characters were present at the same event but not necessarily in the same image. The relationship may be defined by the system, the user or an administrator or similar entity. The criteria for defining the relationship may be provided through any type of user interface mechanisms.

In one embodiment, the process begins by determining the selected character (block 1605). In the initial iteration of the process, the first selected character may be determined by selection of a user through navigation link or similar user interface mechanism corresponding to the character. For example, the process begins after the user clicks on the '2nd connection' navigation link 2230 described in FIG. 22 corresponding to the first selected character. Next, the process determines a set of images associated with the first selected character (block 1610). In one embodiment, the associated images are determined by retrieving the linked images for the first selected character in the link database.

In one embodiment, the process determines whether the set of images associated with the selected character includes any character that meets the criteria of the relationship (block 1615). Characters that meet these criteria are referred to herein as a related character. In this manner, the system may determine the characters that the first selected character is related to directly, referred to herein as a first connection.

The process determines whether matches are found based on the defined relationship criteria (block 1620). If no images are found, then the process may exit (block 1680). Next, the associated images that match the relationship are sorted to determine the order of display for the system (block 1630). In one embodiment, the images may be sorted by the number of instances that the related character is depicted in the matching images. For example, a related character may be depicted in several matching images. The system may sort the matching images in descending order of instances so that a related character with a greater amount of matching images is displayed before another related character with a lesser amount of matching images.

Next, the process determines whether a limit for the search has been reached (block 1635). In one embodiment, a limit may be defined by any criteria including the number of related characters, number of connections or degree of separation or similar criteria. For example, the process may analyze images associated with each related character to discover further connections. In this case, a limit on the depth of the search may be used. If a limit has not been reached, then the process will return to block 1605 to determine the next selected character. For each related character, the next selected character will be the related character. For each image associated with the related character in the link database, the process may determine other known characters being depicted in the same image. In this manner, the system may determine characters that the first selected character is related to by one degree of separation, referred to herein as a second connection. The process will repeat the same steps described above for each related character until the limit has been reached. This search process may be iterative or recursive.

Once the limit has been reached, the system displays the related characters of the selected character (block 1670). In one embodiment, the related characters are displayed in the sorted order. The related characters may also be displayed by their associated portrait in the link database. Finally, the process ends (block 1680).

Although the process describes finding related characters of the first selected character known by a first and second connection, this description does not limit the process. One of skill in the art would appreciate that this process could be modified to include greater orders of connections for the selected character. For example, the process could be modified to determine and display related characters until the process has exhaustively determined all orders of connections for all known characters matching the relationship. The process could also be modified to display a particular order of connection. In one embodiment, the limit may be defined by whether a particular depth order has been reached. For example, the process could find and display only the related characters known by a twelfth order of connection.

Figure 17A:
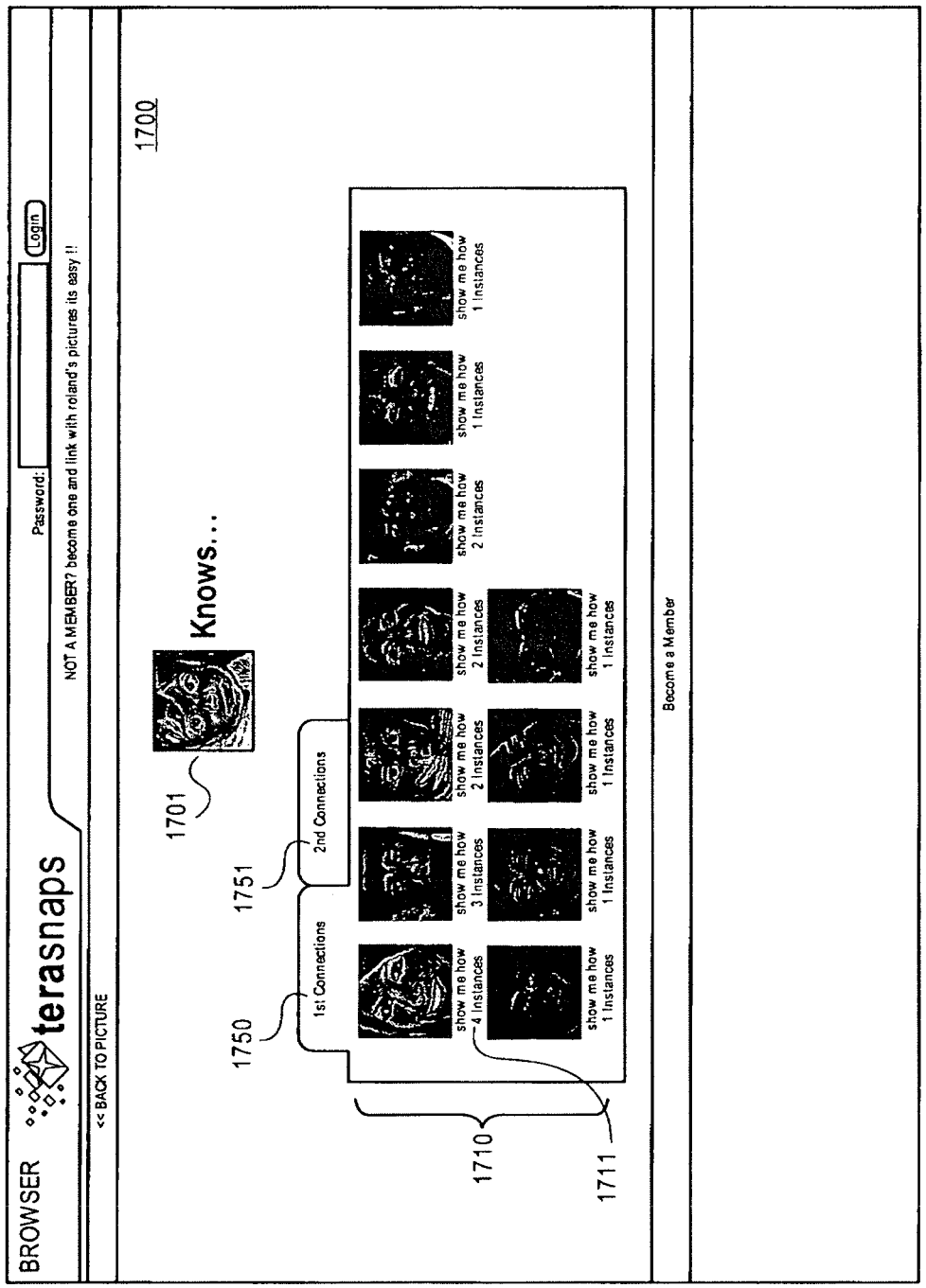
FIG. 17A is a diagram of one embodiment of an interface for viewing characters by their degree of separation.

FIG. 17A is a diagram of one embodiment of an interface for viewing characters by their degree of separation. One embodiment of the order of connection interface 1700 may be viewed when the user uses the 'knows who' navigation link of the album viewing interface or similar user interface element. In one embodiment, the related characters 1710 display a set of characters organized in a tab 1750 that a selected character 1701 is directly connected, referred to herein as a first connection. The characters may be displayed by their associated portrait. In one embodiment, the system searches images associated with the selected character in the link database to match a relationship. In one embodiment, the relationship is defined by the selected character and known character being depicted in the same image. The related characters 1710 may be ordered based on the number of instances that the selected character 1701 and the known character match the relationship. For example, the number of instances 1711 that a known character matches the relationship with the selected character 1701 may be displayed. The related characters 1710 may also include a tab 1751 to display characters known by a second connection.

Although the interface is described as displaying a single order of connection, one skilled in the art would appreciate that other layouts may be utilized. For example, the interface could display characters including all orders of connections organized in tabs, or on a single screen, by displaying related characters iteratively by the order of connection in a vertical or horizontal orientation. Other alternate embodiments not mentioned here could be contemplated by one skilled in the art.

Figure 17B:
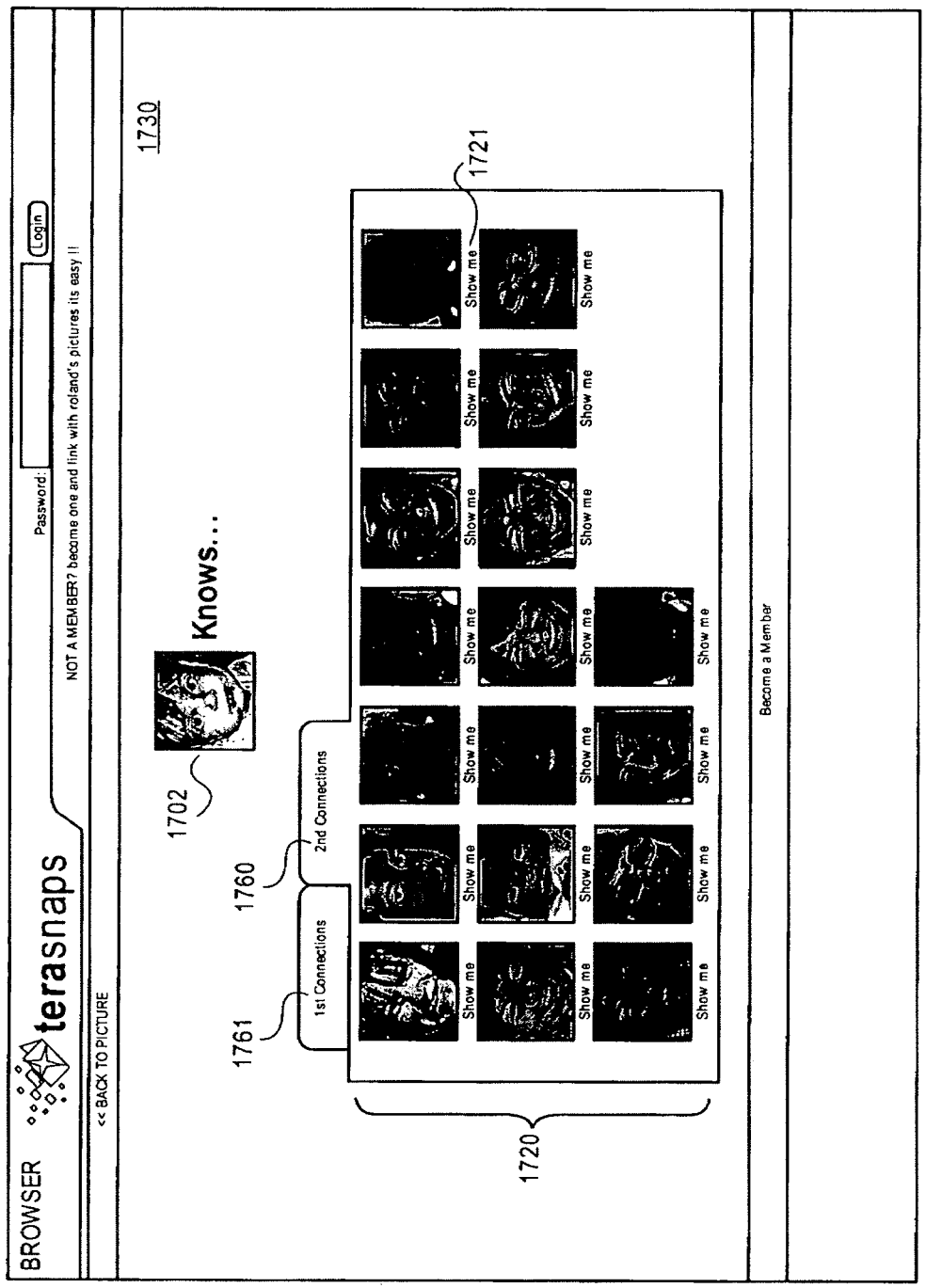
FIG. 17B is a diagram of another embodiment of an interface for viewing characters by their degree of separation.

FIG. 17B is a diagram of another embodiment of an interface for viewing characters by their degree of separation. In one embodiment, the order of connection interface 1730 may be displayed using the '2nd connection' navigation link 2230 described in FIG. 22 or similar user interface element. In one embodiment, order of connection interface 1730 displays a set of characters 1720 organized in a tab 1760 that a selected character 1702 knows by one degree of separation, referred to herein as a second connection. Characters known by a first connection may be displayed in a tab 1761. The characters may be displayed by their associated portrait in the link database. In one embodiment, the system searches for images that match a relationship with characters known by a first connection to determine known characters by a second connection. For example, the relationship may be defined as a character known by a first connection being depicted in the same image as another known character. In one embodiment, a navigation link 1721 may be used to view a path of relationships between the selected character and known characters.

Although the interface is described as displaying a single order of connection, one skilled in the art would appreciate that other layouts may be utilized to display all orders of connections for a selected individual on a single screen or organized in tabs. The interface could also be displayed to model a different structure, such as a tree or network. Other alternate embodiments not mentioned here could be contemplated by one skilled in the art.

Figure 17C:
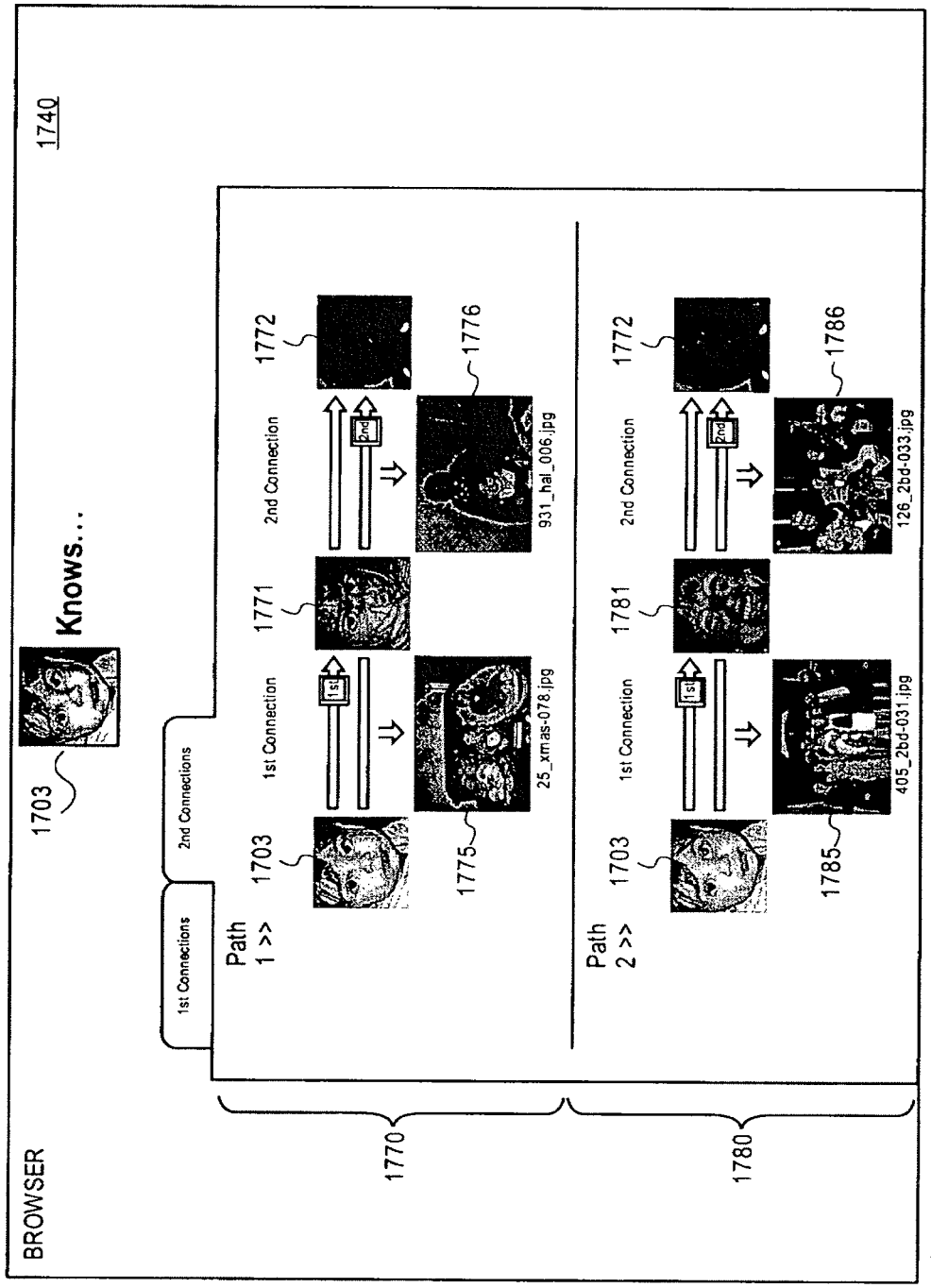
FIG. 17C is a diagram of one embodiment of an interface for viewing a representation of a path of connections.

FIG. 17C is a diagram of one embodiment of an interface for viewing a representation of a path of connections. In one embodiment, a user may view the path of connections interface 1740 for a selected character by using the navigation link described in FIG. 17B.

In one embodiment, a path 1770 displays a selected character 1703 interconnected with a character 1771 by a first connection to form a leg of the path. A character 1771 is interconnected with a character 1772 to form a second leg of the path. In this manner, a path of connections is constructed to display the selected character 1703 with a first connection to the character 1771 and a second connection to character 1772. A character may be displayed using the associated portrait of that character. In one embodiment, an image 1775 indicates the first connection relationship as being the selected character 1703 and character 1771 depicted in the same image. Similarly, an image 1776 indicates the second connection relationship as being character 1771 and the character 1772 depicted in the same image.

In one embodiment, the selected character 1703 has more than one path of connections for the character 1772. Below the path 1770, a second path of connections is displayed by a path 1780. The selected character 1703 is connected with character 1781 by a first connection and connected with character 1772 by a second connection. Further, the system may display any depth of the path of connections to display other existing paths for the selected character. In this manner, the system may display multiple path of connections of any depth based on the relationship. In one embodiment, the order of the multiple paths is based on the character with a greater amount of matching images to the selected character 1703, which is the first person in the path. In this manner, the path with the most frequent character relative to the first person in the path is displayed before another path with the related character with a lesser amount of matching images.

Although in this embodiment the relationship is defined as whether two characters are depicted in the same image, the system may define other relationships to establish connections between characters. In one embodiment, the user or administrator may also define the relationship using an option of the interface or system tool. Further, a relationship could be formed using a combination of several relationships.

Although one example embodiment is described, one skilled in the art would appreciate that there are alternate ways to display the path of connections. For example, the path could be represented in a vertical orientation instead of the horizontal orientation. The path could also be organized in a tree structure to model a genealogy chart. Different sections of the path could be color-coded to denote the strength of the connection dependent on the degree of closeness to the selected character. Further, the path could be represented utilizing a 3-D model with interactive features to enhance the presentation of the connections between characters. Moreover, if multiple paths exist between a selected character and the other characters, these other paths may be displayed elsewhere in the interface. One skilled in the art would also appreciate that different representations and combinations could be utilized to construct other embodiments. For example, the same path could be represented as described above along with a 3-D model of the same path elsewhere in the interface.

Figure 18:
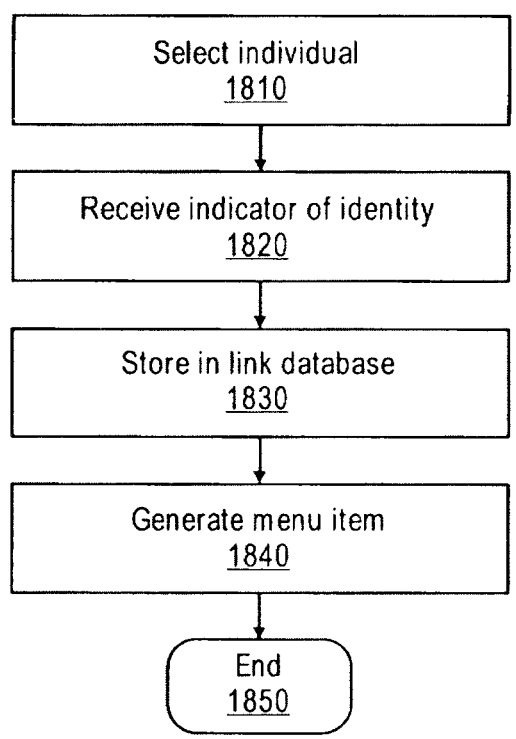
FIG. 18 is a diagram of one embodiment of a process for generating a fast link.

FIG. 18 is a diagram of one embodiment of a process for generating a fast link The process may be used for generating a menu item, referred to herein as a fast link, for identifying a portrait. The portrait corresponding with an individual may have been previously extracted from an image but was not matched with an identity. A plurality of portraits may be extracted from images organized in an album, event or set of albums or events. In this manner, the process may be used to generate a menu item for manually identifying an unknown individual detected in an image.

In one embodiment, the process may begin after at least one portrait is selected to be identified (block 1810). Next, the process receives an indicator of an identity for the selected portrait (block 1820). In one embodiment, this indicator is received after using the user interface for matching the selected portrait to an identity. Next, the process stores the selected portrait in the link database and matches the selected portrait to the identity in the identity database (block 1830). In this manner, the identified portrait becomes a known character in the system. Next, the process automatically generates a menu item, referred to herein as a fast link, that may be used to match another portrait corresponding to the same identity (block 1840). The generated fast link may have the same title as the identity matched with the previously selected portrait. Finally, the process ends (block 1850).

Figure 19A:
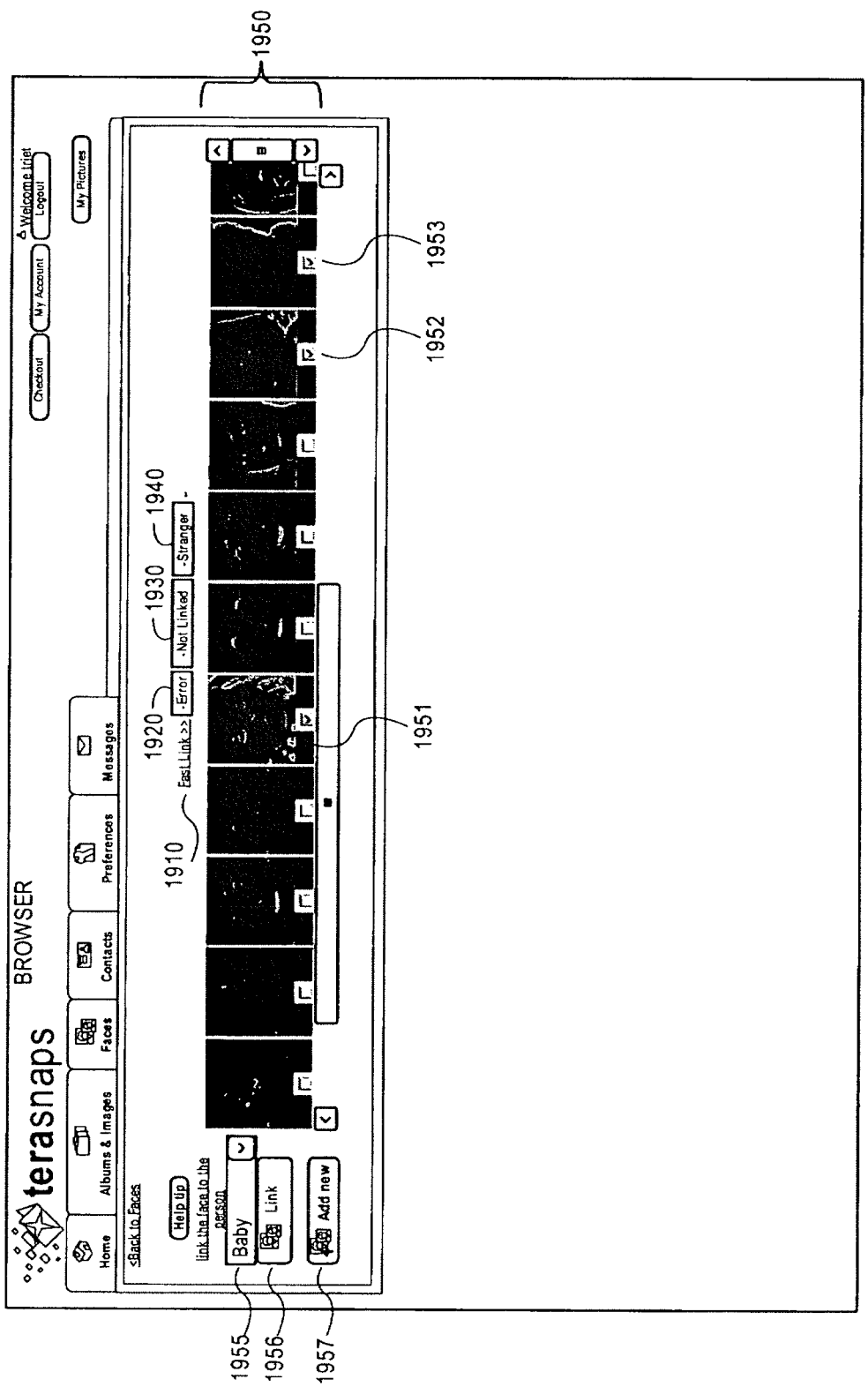
FIG. 19A is a diagram of one embodiment of an interface for generating a fast link.

FIG. 19A is a diagram of one embodiment of an interface for generating a fast link. A user may view this interface for generating a fast link to identify portraits by using the 'organize' navigation link when viewing the album organizational overview interface.

In one embodiment, a fast link menu 1910 displays the menu items associated with each fast link. A fast link allows a selected portrait to be matched with an identity. After a selected portrait is identified, new fast link menu items may be dynamically generated corresponding to the previous matched identity.

The fast link menu 1910 may indude fast links 1920, 1930, and 1940. Fast link 1920 allows for removing an erroneous representation of a portrait from the system. For example, fast link 1920 may be used to remove a selected portrait after the system has erroneously detected a part of an image that does not correspond with an individual. Fast link 1930 allows for removing the identity of a previously identified portrait. Removing the identity reverts the selected portrait to having no identity. Fast link 1940 allows for removing a selected portrait that the user regards as stranger from the system. In this manner, an unknown individual may be removed from the system.

In one embodiment, portraits 1950 displays unidentified portraits that may be selected. These portraits may have been previously extracted from images organized in an album, event or set of albums or events. For example, the user may select unidentified portrait 1951, 1952, and 1953 by clicking on the particular portrait. In this manner, multiple unidentified portraits that correspond to the same identity may be selected by clicking on several portraits. A drop-down menu 1955 allows for selection of an existing identity of a known character. The drop-down menu 1955 may include a list of identities of the known characters in the system. In the case that an identity does not exist for a selected portrait, the user may use the add new button 1957 to create a new identity. This new identity will appear in the drop-down menu 1955 for the user to select.

The user may click on the link button 1956 to match the selected portraits with the identity of the known character selected using the drop-down menu 1955. By using the link button 1956, the system dynamically generates a fast link corresponding to the previously selected identity. The generated fast link (not shown) then appears as a menu item in fast link menu 1910. The user may use the generated fast link to identify other portraits corresponding to the identity associated with the generated fast link without having to use the drop-down menu 1955 for selection thereby speeding up the manual linking process.

Although one embodiment of an interface has been described in FIG. 19A, this description does not limit alternate embodiments. For example, the interface may be constructed using alternate layouts and graphical elements. The portraits may be displayed in a vertical orientation instead of the horizontal orientation. Other alternate embodiments not described herein may be contemplated by one skilled in the art.

Figure 19B:
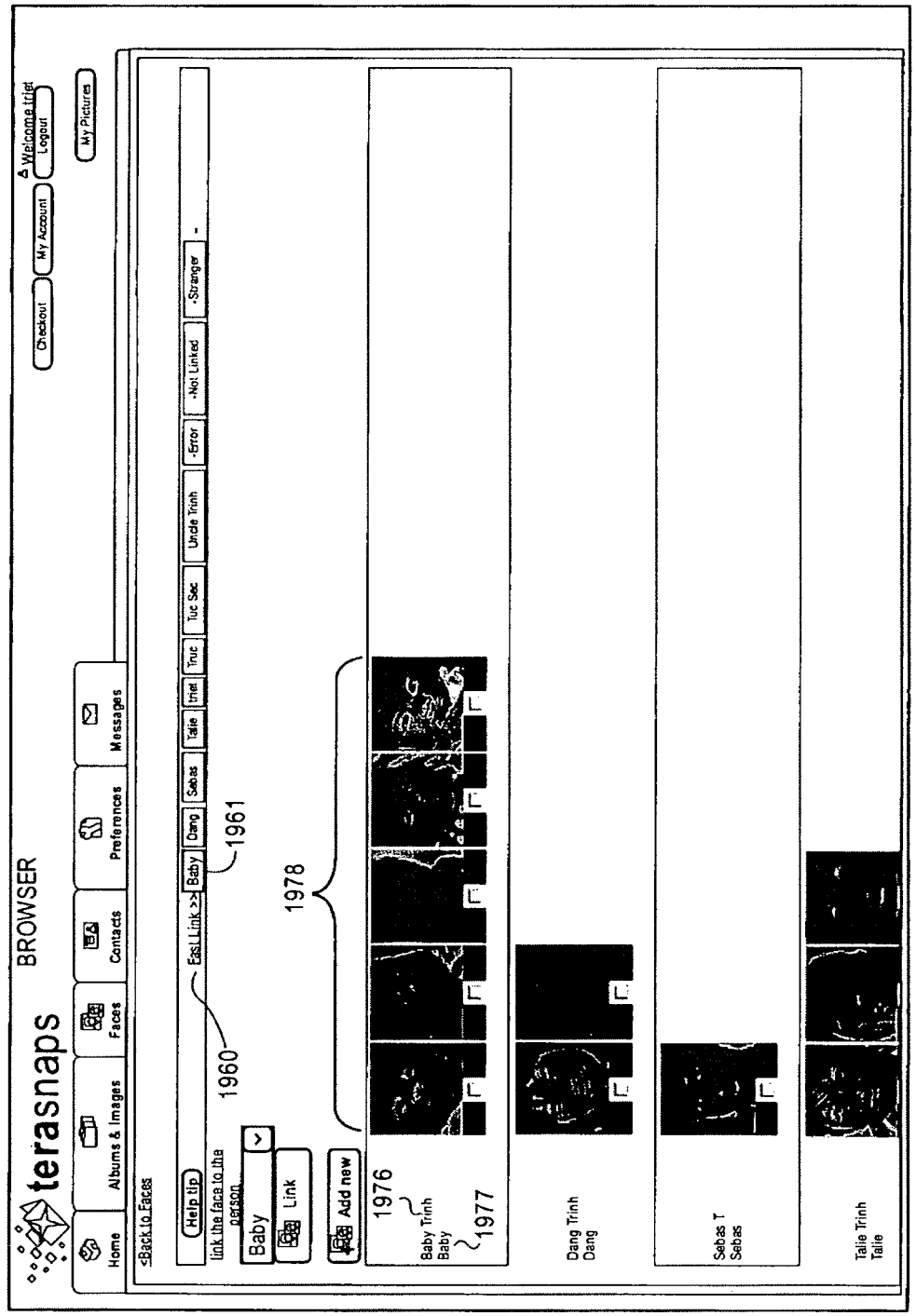
FIG. 19B is a diagram of one embodiment of an interface including a fast link menu.

FIG. 19B is a diagram of one embodiment of an interface including a fast link menu. FIG. 19B includes similar elements that were previously described in FIG. 19A and includes a fast link menu 1960. A user may view this interface and use the fast link menu to identify portraits.

Fast links may be dynamically generated by the system as described in FIG. 19A. As portraits are identified by the user, the fast link menu 1960 is populated with newly generated fast links that are associated with different identities. Identified portraits may be organized in rows corresponding to a name and nickname associated with an identity.

In one embodiment, the fast link menu 1960 comprises a plurality of fast links including, for example, a fast link 1961. Fast link 1961 may be used to match a selected portrait with an identity associated with the name 1976 and nickname 1977. The name 1976 may include the first and last name of the identity. The portraits 1978 are associated with the identity associated with name 1976 and nickname 1977.

One skilled in the art would appreciate that portraits may be matched with an identity using alternate methods. For example, the interface in FIG. 19B could provide a means for dragging and dropping a selected portrait into a section of the interface corresponding to a particular identity.

Figure 20:
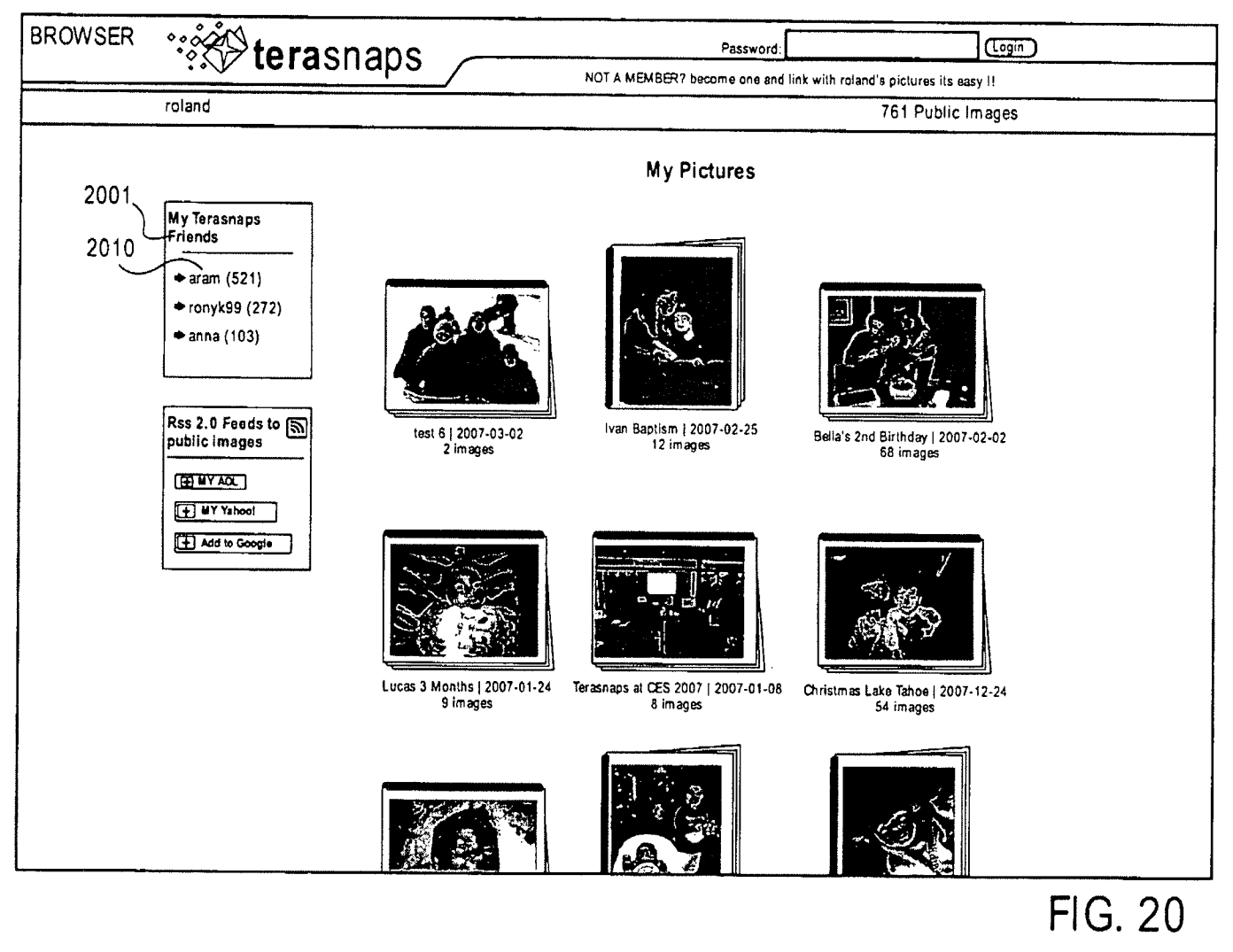

FIG. 20 is a diagram of one embodiment of an interface including a list of other users with images in the system. The user may view this list when viewing an interface of a listing of albums or events. A friends list 2001 displays a set of other users that is generated automatically by the system. These users have separate user accounts and correspond to known characters.

In one embodiment, the system generates friends list 2001 by searching images of another user account associated with a known character. The system may count the number of images associated with each other user. A user link 2010 includes a user name and a number of images associated with the user name. User link 2010 provides navigation to the view these images of the other user account. In this manner, a user may view images of another user account by using user link 2010.

One skilled in the art would appreciate that the friends list 2001 may be displayed using alternate methods. For example, the friends list 2001 could comprise a drop down list, tree view, or an expanding menu that displays when a user input, such as a mouse cursor, hovers over a section of the interface. The friends list 2001 could also be displayed by horizontal orientation or at any position in the interface. A portrait corresponding to each user of the friends list 2001 could also be displayed with each user link.

Figure 21:
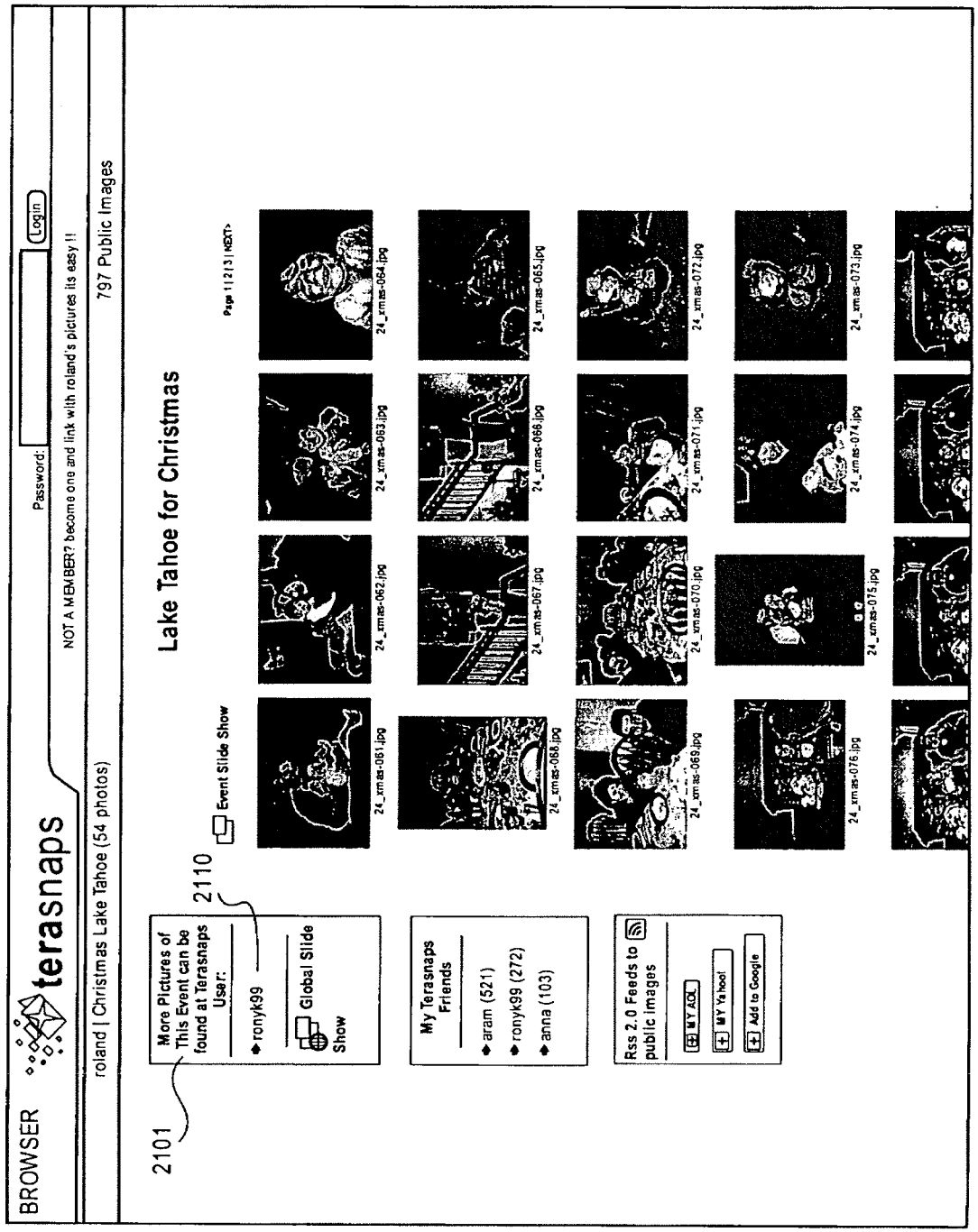
FIG. 21 is a diagram of one embodiment of an interface including a list of other users with images related to the same event.

FIG. 21 is a diagram of one embodiment of an interface including a list of other users with images related to the same event. The event may be organized as an album. The user may view this list when viewing an interface of images of an event or album. The event pictures list 2101 displays a set of other users that is generated automatically by the system. These users have separate user accounts and correspond to known characters.

In one embodiment, a user link 2110 includes a user name. User link 2110 provides navigation to the view these event images of the other user account. In this manner, a user may view images of the same event of another user account by using user link 2110. Although only one user link is shown in FIG. 21, this does not limit the description. The event pictures list 2101 may display all users with images related to the same event. In this manner, the user may be able to view all images of other user accounts related to the event.

In one embodiment, the system searches for images of other user accounts related to the same event. The system detects an overlap in time between two albums corresponding to the same event and then determines whether common characters are present in both albums. The overlap in time may be determined using EXIF information extracted from the images. In addition, the system may also extract GPS information from the images to correlate GPS coordinates with extracted time data for determining overlapping events.

In one embodiment, the system utilizes face detection to determine common characters present in both albums. In another embodiment, the system matches characters common to both albums using a character's e-mail address. Linking characters via an e-mail address requires that the character be previously linked to a known identity.

Other embodiments may be used to display the event pictures list 2101. For example, event pictures list 2101 could be implemented using a drop down list, tree view, or an expanding menu that displays when a user input, such as a mouse cursor, hovers over a section of the interface. Further, event pictures list 2101 could be positioned anywhere within the interface.

Figure 22:
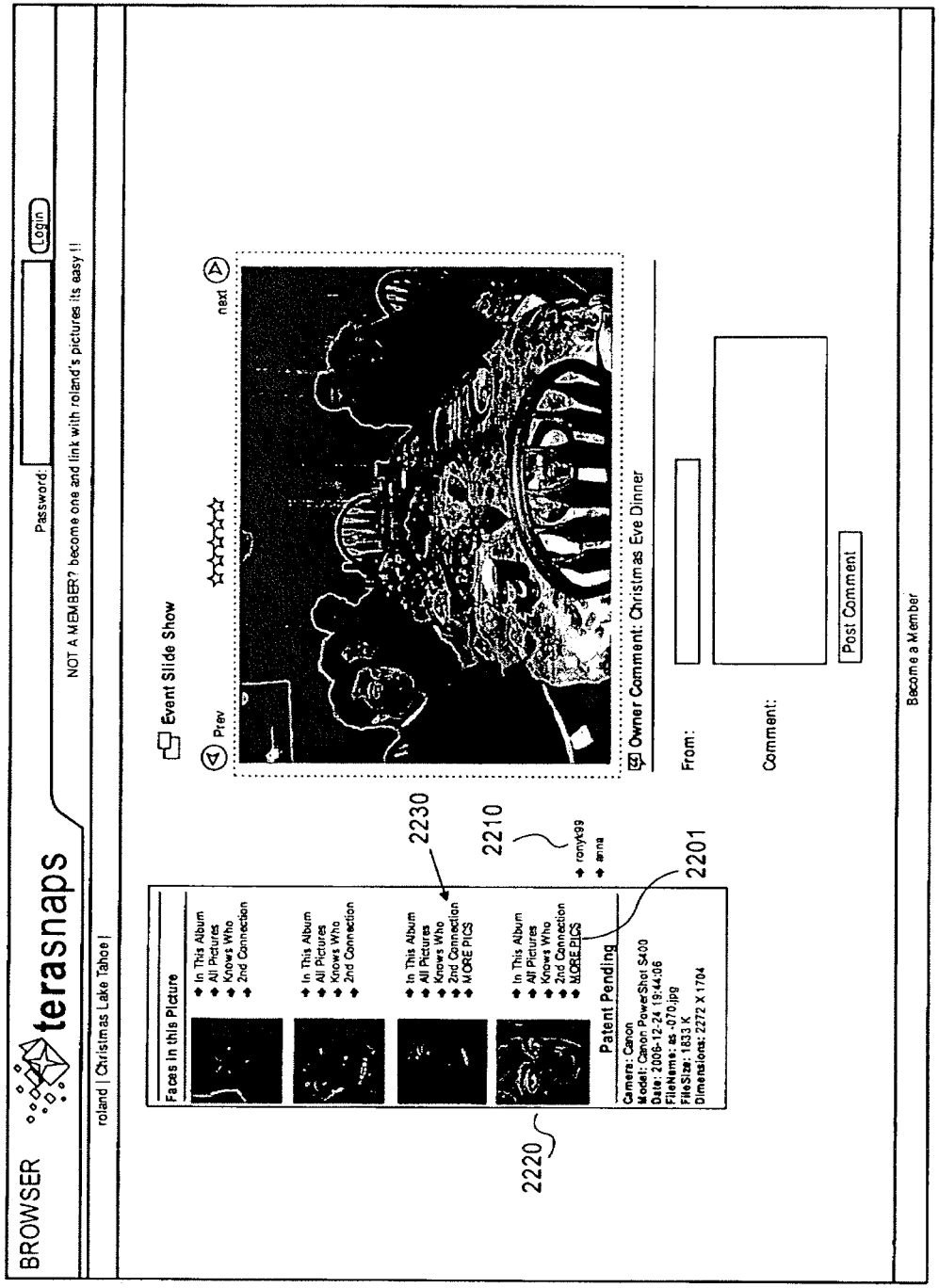
FIG. 22 is a diagram of one embodiment of an interface including a list of other users with images including a selected character.

FIG. 22 is a diagram of one embodiment of an interface including a list of other users with images including a selected character. The user may view this list in an interface for viewing an image in an album or event. The more pics list 2201 displays a list of user links for viewing images of other user accounts that include selected character 2220. Each user link is associated with a separate user account and corresponds to a known character. The '2nd connection' navigation link 2230 displays an interface for viewing characters by their degree of separation described in FIG. 17B.

In one embodiment, the user link 2210 is displayed in response to a user input with more pics list 2201. The user input may comprise of hovering a mouse cursor over more pics list 2201. The system dynamically generates these user links after determining the other users that have images including the selected character 2220. For example, the system searches images of other user accounts to find images including the selected character 2220. User accounts with images matching the selected individual 2220 are included in the list of user links.

In one embodiment, user link 2210 comprises the user name associated with another user account. The user link 2210 provides navigation to view images of the associated user account including the selected character 2220. In this manner, a user may view images of a selected character in other user accounts.

Other embodiments may be used to display the more pics list 2201. For example, more pics list 2201 could be implemented using a drop down list or tree view.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. Thus, if a feature is described with reference to one embodiment it may be used with another.

Further one skilled in the art would appreciate that additional functionality may be obtained from the inherent properties of the system based on the detection and tracking of the relationships between individuals in the image collections including using Boolean logic to generate dynamic albums and collections of images based on a selection of characters who the viewer desires to see or wishes to exclude from viewing. For example, a viewer may select so see all image available for a first character except for images containing a second character. This logic may also be used to edit or redefine albums or image collections. Thus collections of images defined by the Boolean logic may be saved as distinct albums.

Further, the system may scale to a dramatic scale with the linking of images across the accounts of multiple users who have made their individual collections public. The system may provide a set of interfaces for viewing events that may have been witnessed and captured by multiple users. For example, a large number of users may have attended an event such as the Olympics and made their images of the event public. A viewer may brows these images by selecting the characters, in this example, athletes in competition, to see all of the images related to the event in a dynamic album that utilizes images from a large number of user accounts.

In one embodiment, the image management system may be implemented partially or entirely as hardware devices, such as application specific integrated circuits (ASICs). In another embodiment, these components may be implemented in software (e.g., microcode, assembly language or higher level languages). These software implementations may be stored on a machine-readable medium. A "machine readable" medium may include any medium that can store or transfer information. Examples of a machine readable medium include a ROM, a floppy diskette, a CD-ROM, a DVD, flash memory, hard drive, an optical disk or similar medium.

In the foregoing specification, the embodiments of the invention have been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

I claim:

1. A computer-implemented method of recording one or more facial identifications of a digital image in a link database, comprising the steps of:
    uploading an image to a computer and storing the image at an image network storage location;
    detecting, in the image, at least one portrait, wherein the portrait includes a face;
    extracting a character portrait of the at least one portrait from the image as a separate image and storing the character portrait at a character portrait network storage location;
    displaying the image and the character portrait;
    assigning identification data to the character portrait and storing the assigned identification data at an identification data network storage location;
    updating the link database by recording each of the image network storage location, the character portrait network storage location, and the identification data network storage location in one or more fields of the link database so that each is linked to each other;
    searching for at least one related image by using the identification data as search criteria, wherein the searching for the at least one related image comprises searching for the at least one related image within another user account; and
    displaying the at least one related image.

2. The computer-implemented method of claim 1, wherein the step of assigning includes assigning by linking the identification data of a previously identified character portrait stored in the link database to the at least one character portrait, provided that the previously identified character portrait matches the at least one character portrait.

3. The computer-implemented method of claim 1, wherein the step of assigning includes assigning by linking the identification data of a previously identified character portrait stored in the link database to the at least one character portrait, provided that at least one of a face, a character, a set of characters, haar-like features, clothing, a hat, hair, a scar, glasses, an animate object, and an inanimate object of the previously identified character portrait matches the corresponding at least one of a face, a character, a set of characters, haar-like features, clothing, a hat, hair, a scar, glasses, an animate object, and an inanimate object of the at least one character portrait.

4. The computer implemented method of claim 1, wherein the identification data further includes at least one of a null, a name, an email address, account information, public settings, privacy settings, images in an image database, GPS information, and EXIF information.

5. The computer-implemented method of claim 1, further comprising the steps of:
    displaying a fast link that associates the identification data with the at least one character portrait,
    selecting the fast link and the at least one related image, wherein upon selection a link is created between the identification data and the at least one related image and the link is stored into the link database.

6. The computer-implemented method of claim 5, wherein searching for at least one related image includes searching for the at least one related image within one or more of the link database, an image database, a collection of images of an event, and one or more albums.

7. The computer-implemented method of claim 5, wherein displaying the at least one related image and the fast link includes displaying one or more of the at least one related image, at least one related character portrait in the at least one related image and a fast link based upon a degree of separation between the at least one character portrait and the at least one related character portrait.

8. The computer-implemented method of claim 5, wherein the fast link includes an edit fast link to remove at least one of the at least one character portrait and the identification data associated with the at least one character portrait.

9. The computer-implemented method of claim 1, further comprising the step of:

displaying a user link, wherein the user link provides navigation to user accounts that have at least one related image that includes the at least one character portrait.

10. The computer-implemented method of claim 1, wherein assigning the identification data to the character portrait is based on an inanimate object that is displayed in the character portrait.

11. A system of recording one or more facial identifications of a digital image in a link database comprising:
a computer configured to:
receive an uploaded image and store the image at an image network storage location;
detect, in the image, at least one portrait, wherein the portrait includes a face;
extract a character portrait of the at least one portrait from the image as a separate image and storing the character portrait at a character portrait network storage location;
display the image and the character portrait;
assign identification data to the portrait and storing the assigned identification data at an identification data network storage location;
update the link database by recording each of the image network storage location, the character portrait network storage location, and the identification data network storage location in one or more fields of the link database so that each is linked to each other;
search for at least one related image by using the identification data as search criteria, wherein the search for the at least one related image comprises searching for the at least one related image within another user account; and
display the at least one related image.

12. The system claim 11, wherein the computer configured to assign includes the computer configured to assign by linking the identification data of a previously identified character portrait stored in the link database to the at least one character portrait, provided that the previously identified character portrait matches the at least one character portrait.

13. The system claim 11, wherein the computer configured to assign includes the computer configured to assign by linking the identification data of a previously identified character portrait stored in the link database to the at least one character portrait, provided that at least one of a face, a character, a set of characters, haar-like features, clothing, a hat, hair, a scar, glasses, an animate object and an inanimate object of the previously identified character portrait matches the corresponding at least one of a face, a character, a set of characters, haar-like features, clothing, a hat, hair, a scar, glasses, an animate object and an inanimate object of the at least one character portrait.

14. The system of claim 11, wherein the computer configured to assign includes the computer configured to assign by user input of the identification data.

15. The system of claim 11, wherein the identification data includes at least one of a null, a name, an email address, account information, public settings, privacy settings, images in an image database, GPS information, and EXIF information.

16. The system of claim 11, further comprising:
the computer being configured to:
display a fast link that associates the identification data with the at least one character portrait, such that selecting the fast link and the at least one related image will create a link between the identification data and the at least one related image and the link is stored into the link database.

17. The system of claim 16, wherein configured to search for at least one related image includes configured to search for at least one related image within one or more of the link database, an image database, a collection of images of an event, and one or more albums.

18. The system of claim 16, wherein configured to display the at least one related image and a fast link includes configured to display one or more of the at least one related image, at least one related character portrait in the at least one related image and a fast link based upon a degree of separation between the at least one character portrait and the at least one related character portrait.

19. The system of claim 16, wherein the fast link includes an edit fast link to remove at least one of an unidentified at least one character portrait and the identification data associated with an identified at least one character portrait.

20. The system of claim 11, further comprising:
the computer being configured to display a user link, wherein the user link provides navigation to user accounts that have at least one related image that includes the identified at least one character portrait.

* * * * *